US012097701B2

(12) United States Patent
Shimizu et al.

(10) Patent No.: US 12,097,701 B2
(45) Date of Patent: Sep. 24, 2024

(54) JET PARAMETER GENERATION SYSTEM, METHOD OF GENERATING JET PARAMETER, AND NON-TRANSITORY COMPUTER-READABLE STORAGE MEDIUM STORING PROGRAM OF GENERATING JET PARAMETER

(71) Applicant: SII Printek Inc., Chiba (JP)

(72) Inventors: Takayuki Shimizu, Chiba (JP); Masakazu Hirata, Chiba (JP)

(73) Assignee: SII PRINTEK INC., Chiba (JP)

( * ) Notice: Subject to any disclaimer, the term of this patent is extended or adjusted under 35 U.S.C. 154(b) by 184 days.

(21) Appl. No.: 17/983,268

(22) Filed: Nov. 8, 2022

(65) Prior Publication Data

US 2023/0142135 A1 May 11, 2023

(30) Foreign Application Priority Data

Nov. 10, 2021 (JP) ................................. 2021-183749

(51) Int. Cl.
*B41J 2/14* (2006.01)

(52) U.S. Cl.
CPC .. *B41J 2/14201* (2013.01); *B41J 2002/14362* (2013.01); *B41J 2002/14491* (2013.01)

(58) Field of Classification Search
CPC .......... B41J 2/14201; B41J 2002/14362; B41J 2002/14491; B41J 2202/10; B41J 2/04553; B41J 2/04571; B41J 2/04588; B41J 2/04595; B41J 2/04581; B41J 2/2103; B41J 29/39
See application file for complete search history.

(56) References Cited

FOREIGN PATENT DOCUMENTS

JP 2016-203393 A 12/2016
JP 2020044666 A * 3/2020

OTHER PUBLICATIONS

Shimizu, Takayuki, Liquid Jet Head, Liquid Jet Recording Device and Driving Signal Generating System (JP 2020044666A), Mar. 26, 2020, Abstract and Paragraphs [0025, 0032, 0033, 0035, 0061-0062]. (Year: 2020).*

* cited by examiner

*Primary Examiner* — Lisa Solomon
(74) *Attorney, Agent, or Firm* — Crowell & Moring LLP

(57) ABSTRACT

A jet parameter generation system according to an embodiment of the present disclosure includes a data acquisition section, and a parameter generation section for generating a predetermined jet parameter, using a predetermined analytical method of taking a predetermined input parameter as an explanatory variable and taking a predetermined jet parameter as an objective variable. The parameter generation section determines which one of a first standard for setting a voltage value with which a drop volume of the liquid to be a reference is obtained and a second standard for setting a voltage value with which an ejection speed of the liquid to be a reference is obtained is to be selected, selects a first explanatory variable group when determining to select the first standard, while selecting a second explanatory variable group when determined to select the second standard, and uses the predetermined analytical method using just selected one of the first explanatory variable group and the second explanatory variable group to thereby generate the predetermined jet parameter.

14 Claims, 31 Drawing Sheets

FIG. 7

(OBJECTIVE VARIABLE : Prj=Vr)

| | Sample1 | Sample2 | Sample3 | Sample4 | Sample5 | Sample6 |
|---|---|---|---|---|---|---|
| EXPLANATORY VARIABLES | VALUE OF INPUT PARAMETER Prin | | | | | |
| NUMBER OF DROPS (NUMBER OF PULSES) | 10 | 6 | 3 | 1 | 1 | 3 |
| PRESENCE OR ABSENCE OF COMMON DRIVE [0: ABSENCE, 1: PRESENCE, 2: SPECIAL VALUE] | 0 | 1 | 1 | 1 | 0 | 1 |
| HEAD TYPE | B | A | B | B | D | A |
| INK TYPE | Oil | sol | Oil | Oil | WB | Oil |
| (DV STANDARD or Vj STANDARD) | Vj | DV | DV | Vj | Vj | DV |
| HEAD RANK VALUE (INHERENT IN HEAD)[V] | 22.5 | 21.7 | 22.5 | 22.9 | 21.8 | 22 |
| VISCOSITY VALUE AT REFERENCE TEMPERATURE Tr [mPa] | 20.45 | 9.84 | 26.29 | 10.55 | 10.10 | 17.95 |
| SURFACE TENSION VALUE OF INK 9[mN/m] | 30.39 | 30.90 | 29.65 | 31.62 | 35.49 | 29.14 |
| SPECIFIC GRAVITY VALUE OF INK 9 | 1.052 | 0.99 | 1.368 | 0.9 | 1.158 | 1.364 |
| TARGET VALUE OF DV OR Vj | 6 | 89.5 | 60 | 7 | 5 | 40 |
| $\Delta$ Vp [V] | 27.3313 | 21.6443 | 25.1108 | 21.0208 | 23.2532 | 20.2429 |

Prin

FIG. 20

MODIFIED EXAMPLE 1

(OBJECTIVE VARIABLE : Prj=Kc)

| | | Sample1 | Sample2 | Sample3 | Sample4 | Sample5 | Sample6 |
|---|---|---|---|---|---|---|---|
| | EXPLANATORY VARIABLES | VALUE OF INPUT PARAMETER Prin | | | | | |
| Prin | NUMBER OF DROPS (NUMBER OF PULSES) | 1 | 7 | 1 | 3 | 3 | 1 |
| | PRESENCE OR ABSENCE OF COMMON DRIVE [0: ABSENCE, 1: PRESENCE, 2: SPECIAL VALUE] | 2 | 1 | 1 | 1 | 1 | 0 |
| | HEAD TYPE | A | B | C | A | A | D |
| | INK TYPE | Oil | Oil | sol | UV | UV | WB |
| | (DV STANDARD or Vj STANDARD) | DV | Vj | Vj | DV | Vj | Vj |
| | HEAD RANK VALUE (INHERENT IN HEAD)[V] | 21.5 | 22.5 | 19.2 | 21.2 | 21.2 | 21.5 |
| | VISCOSITY VALUE AT REFERENCE TEMPERATURE Tr [mPa] | 16.42 | 26.18 | 7.98 | 14.11 | 14.11 | 9.32 |
| | VOLTAGE SENSITIVITY IN EJECTION Vr (DV or Vj) | 1.30 | 0.63 | 0.99 | 2.49 | 0.78 | 0.60 |
| | SURFACE TENSION VALUE OF INK 9[mN/m] | 29.89 | 29.65 | 29.28 | 23.28 | 23.28 | 43.20 |
| | SPECIFIC GRAVITY VALUE OF INK 9 | 1.204 | 1.368 | 0.998 | 1.232 | 1.232 | 1.087 |
| | $\Delta$Vp[V] | 20.974 | 24.222 | 17.218 | 23.790 | 23.972 | 22.432 |
| | TARGET VALUE OF DV OR Vj | 20 | 7 | 6 | 38 | 7 | 5 |

MODIFIED EXAMPLE 1

(WHEN USING ONLY Prin1)

MODIFIED EXAMPLE 1

(WHEN USING ONLY Prin1)

FIG. 27

MODIFIED EXAMPLE 2

(OBJECTIVE VARIABLE : Prj=ΔVp)

| | Sample1 | Sample2 | Sample3 | Sample4 | Sample5 | Sample6 |
|---|---|---|---|---|---|---|
| EXPLANATORY VARIABLES | VALUE OF INPUT PARAMETER Prin | | | | | |
| NUMBER OF DROPS (NUMBER OF PULSES) | 1 | 1 | 3 | 5 | 5 | 4 |
| PRESENCE OR ABSENCE OF COMMON DRIVE [0: ABSENCE, 1: PRESENCE, 2: SPECIAL VALUE] | 1 | 0 | 1 | 1 | 0 | 0 |
| HEAD TYPE | C | D | B | B | A | A |
| INK TYPE | sol | WB | Oil | UV | WB | WB |
| (DV STANDARD or Vj STANDARD) | Vj | Vj | DV | DV | Vj | Vj |
| HEAD RANK VALUE (INHERENT IN HEAD)[V] | 19.2 | 23 | 22.8 | 23.3 | 22.9 | 22.3 |
| VISCOSITY VALUE AT REFERENCE TEMPERATURE Tr [mPa] | 8.47 | 9.49 | 15.91 | 8.47 | 8.57 | 9.62 |
| VOLTAGE SENSITIVITY IN EJECTION Vr (DV or Vj) | 0.96 | 0.63 | 4.29 | 6.34 | 0.50 | 0.40 |
| SURFACE TENSION VALUE OF INK 9[mN/m] | 29.1 | 38.8 | 28.23 | 23.11 | 27.81 | 25.99 |
| SPECIFIC GRAVITY VALUE OF INK 9 | 0.986 | 1.105 | 1.127 | 1.085 | 1.116 | 1.062 |
| TARGET VALUE OF DV OR Vj | 6 | 5 | 51 | 82 | 7 | 6.5 |

Prin

JET PARAMETER GENERATION SYSTEM, METHOD OF GENERATING JET PARAMETER, AND NON-TRANSITORY COMPUTER-READABLE STORAGE MEDIUM STORING PROGRAM OF GENERATING JET PARAMETER

RELATED APPLICATIONS

This application claims priority to Japanese Patent Application No. 2021-183749, filed on Nov. 10, 2021, the entire content of which is incorporated herein by reference.

BACKGROUND OF THE INVENTION

1. Field of the Invention

The present disclosure relates to a jet parameter generation system, a method of generating a jet parameter, and a non-transitory computer-readable storage medium storing a program of generating a jet parameter.

2. Description of the Related Art

Liquid jet recording devices equipped with liquid jet heads are used in a variety of fields, and a variety of types of liquid jet heads have been developed (see, e.g., JP-A-2016-203393).

In such liquid jet heads, it is required to enhance convenience of the user.

It is desirable to provide a jet parameter generation system, a method of generating a jet parameter, and a program of generating a jet parameter each capable of enhancing the convenience of the user.

SUMMARY OF THE INVENTION

A jet parameter generation system according to an embodiment of the present disclosure is a system configured to generate a predetermined jet parameter to be used when generating a drive signal which is applied to a jet section configured to jet liquid, and which has a single pulse or a plurality of pulses, the system including a data acquisition section configured to obtain a selection instruction signal input from an outside and a predetermined input parameter as input data, and a parameter generation section configured to generate the predetermined jet parameter based on the selection instruction signal and the predetermined input parameter using a predetermined analytical method taking the predetermined input parameter as an explanatory variable and taking the predetermined jet parameter as an objective variable. The parameter generation section determines which one of a first standard and a second standard is to be selected based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, selects a first explanatory variable group included in the predetermined input parameter as the explanatory variable when determining that the first standard is to be selected, while selecting a second explanatory variable group included in the predetermine input parameter as the explanatory variable when determining that the second standard is to be selected, and uses the predetermined analytical method using just selected one of the first explanatory variable group and the second explanatory variable group to thereby generate the predetermined jet parameter.

A method of generating a jet parameter according to an embodiment of the present disclosure is a method of generating a predetermined jet parameter to be used when generating a drive signal which is applied to a jet section configured to jet liquid, and which has a single pulse or a plurality of pulses, the method including obtaining a selection instruction signal input from an outside and a predetermined input parameter as input data, and generating the predetermined jet parameter based on the selection instruction signal and the predetermined input parameter using a predetermined analytical method taking the predetermined input parameter as an explanatory variable and taking the predetermined jet parameter as an objective variable. When generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

A non-transitory computer-readable storage medium storing a program of generating a jet parameter is a non-transitory computer-readable storage medium storing a program of generating a predetermined jet parameter to be used when generating a drive signal which is applied to a jet section configured to jet liquid, and which has a single pulse or a plurality of pulses, the program making a computer execute processing including obtaining a selection instruction signal input from an outside and a predetermined input parameter as input data, and generating the predetermined jet parameter based on the selection instruction signal and the predetermined input parameter using a predetermined analytical method taking the predetermined input parameter as an explanatory variable and taking the predetermined jet parameter as an objective variable. When generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

According to the jet parameter generation system, the method of generating the jet parameter, and the non-transitory computer-readable storage medium storing the program of generating the jet parameter related to the embodiment of the present disclosure, it becomes possible to enhance the convenience of the user.

BRIEF DESCRIPTION OF THE DRAWINGS

FIG. 7 is a diagram showing an example of predetermined input parameters related to the embodiment.

FIG. 20 is a diagram showing an example of predetermined input parameters related to Modified Example 1.

FIG. 27 is a diagram showing an example of predetermined input parameters related to Modified Example 2.

DETAILED DESCRIPTION OF THE PREFERRED EMBODIMENTS

An embodiment of the present disclosure will hereinafter be described in detail with reference to the drawings. It should be noted that the description will be presented in the following order.

1. Embodiment (an example in which an information processor is disposed in an information processing device located outside a liquid jet recording device)
2. Modified Examples Modified Example 1 (an example when a predetermined jet parameter is a conversion coefficient)

Modified Example 2 (an example when a predetermined jet parameter is a voltage shift amount)

Modified Example 3 (an example in which an information processor is disposed in a server located outside a liquid jet recording device)

Modified Example 4 (an example in which an information processor is disposed inside a liquid jet head in a liquid jet recording device)

Modified Example 5 (an example in which an information processor is disposed outside a liquid jet head in a liquid jet recording device)

Modified Example 6 (an example in which a signal generation section is further disposed in an information processor)

3. Other Modified Examples

1. EMBODIMENT

[A. Overall Configuration of Printer 1]

Figure 1:
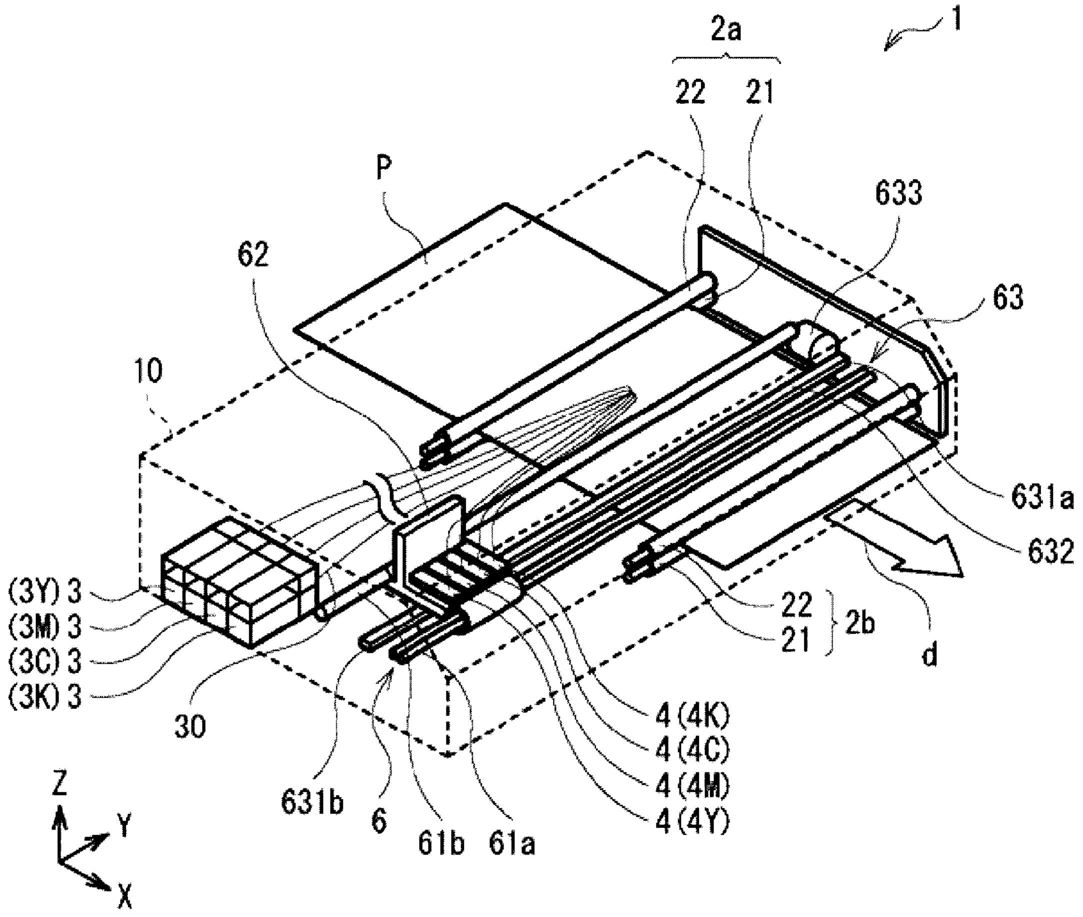
FIG. 1 is a schematic perspective view showing a schematic configuration example of a liquid jet recording device according to an embodiment of the present disclosure.

FIG. 1 is a perspective view schematically showing a schematic configuration example of a printer 1 as a liquid jet recording device according to an embodiment of the present disclosure. The printer 1 is an inkjet printer for performing recording (printing) of images, characters, and the like on recording paper P as a recording target medium using ink 9 described later.

As shown in FIG. 1, the printer 1 is provided with a pair of carrying mechanisms 2*a*, 2*b*, ink tanks 3, ink supply tubes 30, inkjet heads 4, and a scanning mechanism 6. These members are housed in a chassis 10 having a predetermined shape. It should be noted that a scale size of each of the members is accordingly altered so that the member is shown in a recognizable size in the drawings used in the description of the present specification.

Here, the printer 1 corresponds to a specific example of the "liquid jet recording device" in the present disclosure, and the inkjet heads 4 (inkjet heads 4Y, 4M, 4C, and 4K described later) each correspond to a specific example of a "liquid jet head" in the present disclosure. Further, the ink 9 corresponds to a specific example of a "liquid" in the present disclosure.

As shown in FIG. 1, the carrying mechanisms 2*a*, 2*b* are each a mechanism for carrying the recording paper P along a carrying direction d (an X-axis direction). These carrying mechanisms 2*a*, 2*b* each have a grit roller 21, a pinch roller 22, and a drive mechanism (not shown). This drive mechanism is a mechanism for rotating (rotating in a Z-X plane) the grit roller 21 around an axis, and is constituted by, for example, a motor.

(Ink Tanks 3)

The ink tanks 3 are each a tank for containing the ink 9 inside. As the ink tanks 3, there are disposed four types of tanks which individually contain the ink 9 of four colors of yellow (Y), magenta (M), cyan (C), and black (K) in this example as shown in FIG. 1. Specifically, there are disposed the ink tank 3Y for containing the ink 9 having a yellow color, the ink tank 3M for containing the ink 9 having a magenta color, the ink tank 3C for containing the ink 9 having a cyan color, and the ink tank 3K for containing the ink 9 having a black color. These ink tanks 3Y, 3M, 3C, and 3K are arranged side by side along the X-axis direction inside the chassis 10.

It should be noted that the ink tanks 3Y, 3M, 3C, and 3K have the same configuration except the color of the ink 9 contained, and are therefore collectively referred to as ink tanks 3 in the following description.

(Inkjet Heads 4)

The inkjet heads 4 are each a head for jetting (ejecting) the ink 9 shaped like a droplet from a plurality of nozzles (nozzle holes Hn) described later to the recording paper P to thereby perform recording (printing) of images, characters, and so on. As the inkjet heads 4, there are also disposed four types of heads for individually jetting the four colors of ink 9 respectively contained in the ink tanks 3Y, 3M, 3C, and 3K described above in this example as shown in FIG. 1. Specifically, there are disposed the inkjet head 4Y for jetting the ink 9 having a yellow color, the inkjet head 4M for jetting the ink 9 having a magenta color, the inkjet head 4C for jetting the ink 9 having a cyan color, and the inkjet head 4K for jetting the ink 9 having a black color. These inkjet heads 4Y, 4M, 4C and 4K are arranged side by side along the Y-axis direction inside the chassis 10.

Figure 2:
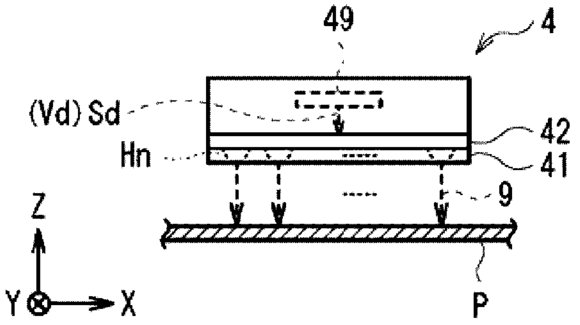
FIG. 2 is a schematic diagram showing a schematic configuration example of a liquid jet head shown in FIG. 1.

It should be noted that the inkjet heads 4Y, 4M, 4C and 4K have the same configuration except the color of the ink 9 used therein, and are therefore collectively referred to as inkjet heads 4 in the following description. Further, the detailed configuration example of the inkjet heads 4 will be described later (FIG. 2).

The ink supply tubes 30 are each a tube through which the ink 9 is supplied from the inside of the ink tank 3 toward the inside of the inkjet head 4. The ink supply tubes 30 are each formed of, for example, a flexible hose having such flexibility as to be able to follow the action of the scanning mechanism 6 described below.

(Scanning Mechanism 6)

The scanning mechanism 6 is a mechanism for making the inkjet heads 4 perform a scanning operation along the width direction of the recording paper P (the Y-axis direction). As shown in FIG. 1, the scanning mechanism 6 has a pair of guide rails 61*a*, 61*b* disposed so as to extend along the Y-axis direction, a carriage 62 movably supported by these guide rails 61a, 61b, and a drive mechanism 63 for moving the carriage 62 along the Y-axis direction.

The drive mechanism 63 has a pair of pulleys 631a, 631b disposed between the guide rails 61a, 61b, an endless belt 632 wound between these pulleys 631a, 631b, and a drive motor 633 for rotationally driving the pulley 631a. Further, on the carriage 62, there are arranged the four types of inkjet heads 4Y, 4M, 4C and 4K described above side by side along the Y-axis direction.

It should be noted that it is arranged that such a scanning mechanism 6 and the carrying mechanisms 2a, 2b described above constitute a moving mechanism for moving the inkjet heads 4 and the recording paper P relatively to each other.

[B. Detailed Configuration of Inkjet Heads 4]

Then, the detailed configuration example of the inkjet heads 4 will be described with reference to FIG. 2.

FIG. 2 is a diagram schematically showing the schematic configuration example of each of the inkjet heads 4.

As shown in FIG. 2, the inkjet head 4 has a nozzle plate 41, an actuator plate 42, and a driver 49.

It should be noted that the nozzle plate 41 and the actuator plate 42 correspond to a specific example of a "jet section" in the present disclosure.

(Nozzle Plate 41)

The nozzle plate 41 is a plate formed of a film material such as polyimide, or a metal material, and has the plurality of nozzle holes Hn for jetting the ink 9 as shown in FIG. 2 (see the dotted arrows in FIG. 2). These nozzle holes Hn are formed side by side in alignment (along the X-axis direction in this example) at predetermined intervals.

(Actuator Plate 42)

The actuator plate 42 is a plate formed of a piezoelectric material such as PZT (lead zirconate titanate). The actuator plate 42 is provided with a plurality of channels (not shown). These channels are each a part functioning as a pressure chamber for applying pressure to the ink 9, and are arranged side by side so as to be parallel to each other at predetermined intervals. Each of the channels is partitioned with drive walls (not shown) formed of a piezoelectric body, and forms a groove part having a recessed shape in a cross-sectional view.

In such channels, there exist ejection channels for ejecting the ink 9, and dummy channels (non-ejection channels) which do not eject the ink 9. In other words, it is configured that the ejection channels are filled with the ink 9 on the one hand, but the dummy channels are not filled with the ink 9 on the other hand. Further, it is configured that each of the ejection channels is communicated with the nozzle hole Hn in the nozzle plate 41 on the one hand, but each of the dummy channels is not communicated with the nozzle hole Hn on the other hand. The ejection channels and the dummy channels are alternately arranged side by side along a predetermined direction.

On the inner side surfaces opposed to each other in the drive wall described above, there are respectively disposed drive electrodes (not shown). As the drive electrodes, there exist common electrodes disposed on the inner side surfaces facing the ejection channels, and active electrodes (individual electrodes) disposed on the inner side surfaces facing the dummy channels. These drive electrodes and the drive circuit in a drive board (not shown) are electrically coupled to each other via a plurality of extraction electrodes provided to a flexible board (not shown). Thus, it is configured that a drive voltage Vd (a drive signal Sd) is applied to each of the drive electrodes from the drive circuit including the driver 49 via the flexible board.

(Driver 49)

The driver 49 is a device which applies the drive voltages Vd (the drive signal Sd) described above to the actuator plate 42 to expand or contract the ejection channels described above to thereby jet (make the actuator plate 42 perform the jetting operation of) the ink 9 from the respective nozzle holes Hn (see FIG. 2). Specifically, the driver 49 is configured to make the actuator plate 42 perform such a jet operation using the drive signal Sd generated in a signal generation section 48 described later.

[C. Overall Configuration of Jet Parameter Generation System 5]

Then, an overall configuration example of a jet parameter generation system 5 (a characteristic table generation system) configured including the printer 1 having the inkjet heads 4 described above will be described with reference to FIG. 3 through FIG. 6C.

Figure 3:
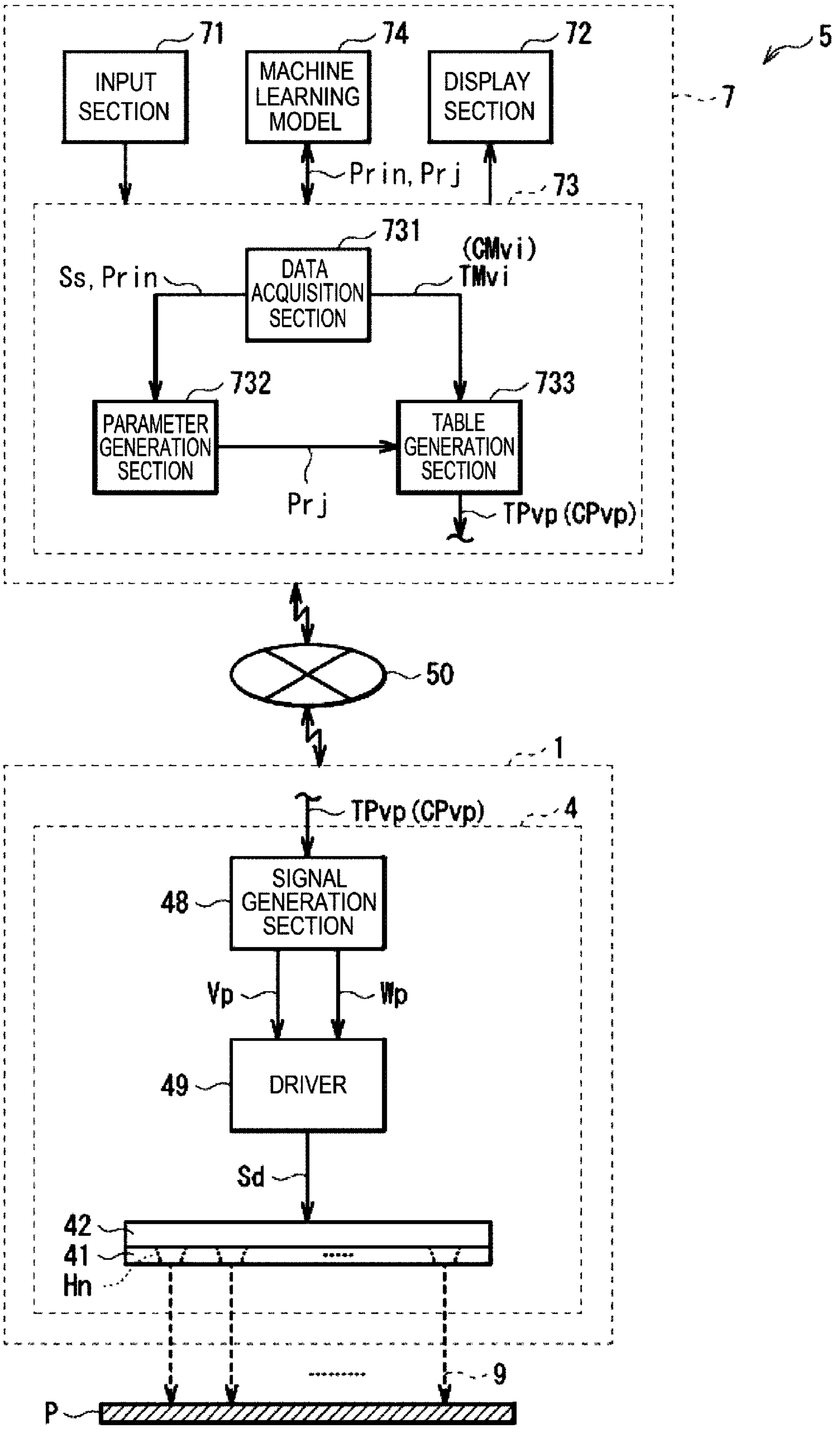
FIG. 3 is a functional block diagram showing a configuration example of a jet parameter generation system according to the embodiment.
Figure 4:
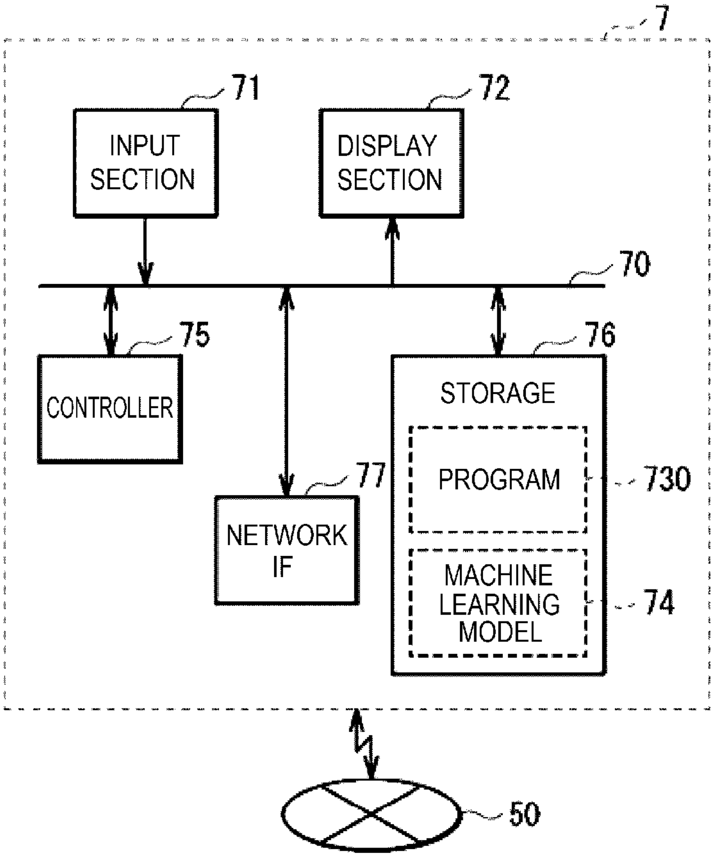
FIG. 4 is a physical block diagram showing a configuration example of an information processing device shown in FIG. 3.
Figure 5:
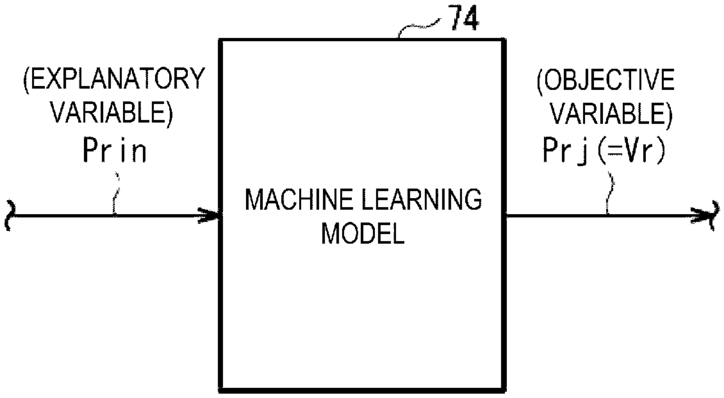
FIG. 5 is a block diagram showing a detailed configuration example of a machine learning model shown in FIG. 3 and FIG. 4.

FIG. 3 is a block diagram (a functional block diagram) showing the configuration example of the jet parameter generation system 5 according to the present embodiment, and FIG. 4 is a block diagram (a physical block diagram) showing a configuration example of the information processing device 7 (described later) shown in FIG. 3. Further, FIG. 5 is a block diagram showing a detailed configuration example of a machine learning model 74 shown in FIG. 3 and FIG. 4.

It should be noted that a jet parameter generation method (a characteristic table generation method) according to the present embodiment is embodied in the jet parameter generation system 5 (a characteristic table generation system) according to the present embodiment, and therefore will also be described. This point also applies to modified examples (Modified Examples 1 through 6) described later.

The jet parameter generation system 5 is a system for generating a predetermined jet parameter Prj used when generating the drive signal Sd described above. Further, in the jet parameter generation system 5 (the characteristic table generation system), it is configured that a predetermined predictive voltage characteristic table TPvp is generated based on the jet parameter Prj generated in such a manner (see FIG. 3). As shown in FIG. 3, the jet parameter generation system 5 is provided with the printer 1 having the inkjet heads 4 described above, and the information processing device 7. Further, the printer 1 and the information processing device 7 are connected to each other via a network 50.

It should be noted that such a network 50 is, for example, a network which performs communication using a communications protocol (TCP/IP) normally used in the Internet. The network 50 can be, for example, a secure network which performs communication using a communications protocol unique to the network. Further, the network 50 is, for example, the Internet, an intranet, or a local area network. The connection between such a network 50, and the printer 1 and the information processing device 7 can be achieved by, for example, a wired LAN (Local Area Network) such as Ethernet (a registered trademark), a wireless LAN such as Wi-Fi (a registered trademark), or a mobile telephone line.

(Information Processing Device 7)

The information processing device 7 is a device located outside the printer 1, and is formed of, for example, a PC (Personal Computer). As shown in FIG. 3 (the functional block diagram), the information processing device 7 has an input section 71, a display section 72, an information processor 73, and the machine learning model 74.

It should be noted that such an information processing device 7 corresponds to a specific example of an "external device" in the present disclosure.

The input section 71 is a section which receives an instruction from the outside (e.g., a user), and then outputs the instruction thus received to the information processor 73. Such an input section 71 is formed of, for example, a keyboard and a mouse. Further, it is possible for the input section 71 to be formed of, for example, a touch panel disposed on (a display surface of) the display section 72 in the information processing device 7.

The display section 72 is a section which displays an image based on a video signal output from the information processor 73. Such a display section 72 is configured using a display of a variety of types (e.g., a liquid crystal display, a CRT (Cathode Ray Tube) display, or an organic EL (Electro Luminescence) display).

The information processor 73 is a section for performing a variety of types of information processing and so on, and has a data acquisition section 731, a parameter generation section 732, and a table generation section 733 as shown in FIG. 3. Further, as shown in FIG. 4 (the physical block diagram), such an information processor 73 is configured using a controller 75, a storage 76, and a network IF (Interface) 77. It should be noted that in the example shown in FIG. 4, the input section 71, the display section 72, the controller 75, the storage 76, and the network IF 77 are coupled to each other via a bus 70.

As shown in FIG. 3, the data acquisition section 731 is a section which obtains the following data (input data) via the input section 71, the network 50, and so on described above. Specifically, the data acquisition section 731 is configured to obtain a predetermined measured viscosity characteristic table TMvi, a predetermined selection instruction signal Ss input from the outside, and predetermined input parameters Prin described later as the input data.

As shown in FIG. 3, the parameter generation section 732 is a section which generates the predetermined jet parameter Prj described above by using a predetermined analytical method based on the selection instruction signal Ss and the input parameters Prin obtained in the data acquisition section 731. The predetermined analytical method means an analytical method taking the input parameters Prin described above as explanatory variables, and at the same time, taking the jet parameter Prj described above as an objective variable. Further, as shown in FIG. 3 and FIG. 4, in the example of the present embodiment, the parameter generation section 732 is configured to generate the jet parameter Prj based on the input parameters Prin utilizing an analytical method using the machine learning model 74 hereinafter described.

As described above, such a machine learning model 74 is a predictive model obtained by performing the mechanical learning taking the input parameters Prin as the explanatory variables and taking the jet parameter Prj as the objective variable. Further, as shown in FIG. 5, the machine learning model 74 is configured to generate (predict) the jet parameter Prj (the objective variable) based on a learning result and then output the jet parameter Prj thus generated when the input parameters Prin (the explanatory variables) are input.

Here, as shown in, for example, FIG. 5, in the present embodiment, there is described mainly when the jet parameter Prj is generated so as to include at least a voltage sensitivity Vr described later as an example. In other words, the voltage sensitivity Vr corresponds to a specific example of a "predetermined jet parameter" in the present disclosure.

It should be noted that as the analytical method (a prediction method) using the machine learning model 74 described above, there can be cited, for example, a support vector machine (SVM), a random forest (RF), and a multiple regression analysis.

As shown in FIG. 3, the table generation section 733 is a section which performs a predetermined conversion process using at least one of the measured viscosity characteristic table TMvi obtained by the data acquisition section 731 and the jet parameters Prj generated by the parameter generation section 732 to thereby generate the predictive voltage characteristic table TPvp. The predictive voltage characteristic table TPvp generated in such a manner is configured to be supplied to a signal generation section 48 described later in the inkjet head 4 in the printer 1 via the network 50.

It should be noted that the details of the predetermined conversion process described above, the measured viscosity characteristic table TMvi, and the predictive voltage characteristic table TPvp will be described in Modified Example 1 described later. Further, the details of processing in such an information processor 73 (the data acquisition section 731, the parameter generation section 732, and the table generation section 733) will also be described later.

The controller 75 shown in FIG. 4 is a section configured including a CPU (Central Processing Unit), a GPU (Graphics Processing Unit), and so on to execute, for example, a variety of programs stored in the storage 76. Specifically, as shown in, for example, FIG. 4, the controller 75 is configured to execute a program 730 stored in the storage 76. The program 730 is a program for executing the processing in the information processor 73 (the data acquisition section 731, the parameter generation section 732, and the table generation section 733) described above. Specifically, the program 730 is a program for making a computer (the controller 75) execute the functions in the information processor 73 (the data acquisition section 731, the parameter generation section 732, and the table generation section 733).

The storage 76 is a section for storing a variety of programs to be executed by the controller 75 and a variety of types of data. As shown in FIG. 4, the storage 76 stores the program 730 described above as an example of such a variety of programs, and at the same time, stores the machine learning model 74 described above as an example of such a variety of types of data. Such a storage 76 is configured using, for example, a RAM (Random Access Memory), a ROM (Read Only Memory), and an auxiliary storage device (a hard disk drive or the like).

As shown in FIG. 4, the network IF 77 is a communication interface for performing communication with the printer 1 via the network 50.

(Signal Generation Section 48)

Here, in the example shown in FIG. 3, the inkjet heads 4 each have the signal generation section 48 in addition to the nozzle plate 41, the actuator plate 42, and the driver 49 described above. The signal generation section 48 is a section for generating the drive signal Sd having one pulse or a plurality of pulses (having a pulse width Wp and a voltage value Vp representing a crest value) using the predictive voltage characteristic table TPvp generated by the table generation section 733 in the information processing device 7 in such a manner as described above.

Figures 6A, 6B, 6C:
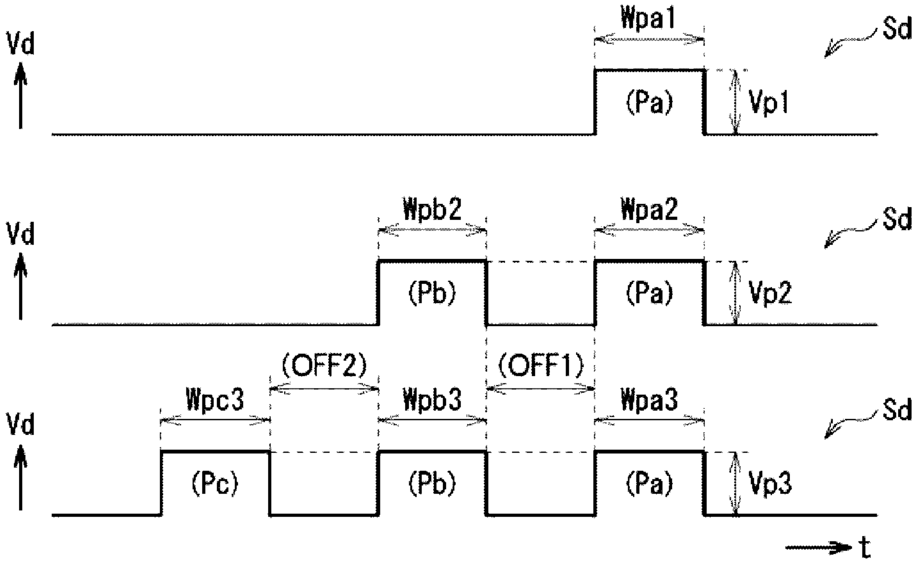
FIG. 6A, FIG. 6B and FIG. 6C are each a timing chart schematically showing a configuration example of a drive signal.

Here, FIG. 6A through FIG. 6C are each a timing chart schematically showing a configuration example of such a drive signal Sd. It should be noted that in FIG. 6A through FIG. 6C, the horizontal axis represents time t, and the vertical axis represents a drive voltage Vd (a positive voltage in this example) in the drive signal Sd, respectively.

First, the drive signal Sd shown in FIG. 6A has a single pulse (a pulse Pa) and corresponds to an example of a case of a so-called "one drop." The pulse Pa represents an ON period disposed between a rising timing and a falling timing, and has a pulse width Wpa1 and a voltage value Vp1 as an example of the pulse width Wp and the voltage value Vp described above.

In contrast, the drive signal Sd shown in FIG. 6B has the following two pulses (pulses Pa, Pb) as the pulses to which a so-called "multi-pulse method" is applied (an example of a case of a so-called "two drops"). That is, as such pulses (the ON periods), there are disposed the two pulses, namely the pulses Pa, Pb. It should be noted that an OFF period ("OFF1") is disposed between these two pulses Pa, Pb. Further, as an example of the pulse width Wp and the voltage value Vp described above, the pulse Pa has a pulse width Wpa2 and a voltage value Vp2, and the pulse Pb has a pulse width Wpb2 and the voltage value Vp2.

Similarly, the drive signal Sd shown in FIG. 6C has the following three pulses (pulses Pa, Pb, and Pc) as the pulses to which the "multi-pulse method" described above is applied (an example of a case of a so-called "three drops"). That is, as such pulses (the ON periods), there are disposed the three pulses, namely the pulses Pa, Pb, and Pc. It should be noted that an OFF period ("OFF1") is disposed between the pulses Pa, Pb, and at the same time, an OFF period ("OFF2") is disposed between the pulses Pb, Pc. Further, as an example of the pulse width Wp and the voltage value Vp described above, the pulse Pa has a pulse width Wpa3 and a voltage value Vp3, the pulse Pb has a pulse width Wpb3 and the voltage value Vp3, and the pulse Pc has a pulse width Wpc3 and the voltage value Vp3.

It should be noted that each of these pulses Pa, Pb, and Pc in the drive signal Sd forms a positive pulse which expands the ejection channel described above in a period of a high (High) state, and contracts the ejection channel in a period of a low (Low) state.

Here, the signal generation section 48 sets each of the pulse width Wp and the voltage value Vp in such pulses (the pulses Pa, Pb, and Pc) to generate the drive signal Sd using the pulse width Wp and the voltage value Vp thus set. Specifically, the signal generation section 48 is configured to obtain the voltage value Vp of the pulse using the predictive voltage characteristic table TPvp described above, and at the same time, generate the drive signal Sd using the pulse having the voltage value Vp thus obtained.

It should be noted that the voltage value Vp described above corresponds to a specific example of the "crest value" in the present disclosure. Further, the "pulse" described above is in a concept including not only such rectangular waves as shown in FIG. 6A through FIG. 6C, but also waveforms such as a trapezoidal wave, a triangular wave, or a stepped wave, which applies to the following.

s[Operations and Functions/Advantages]

(A. Basic Operation of Printer 1)

In the printer 1, a recording operation (a printing operation) of images, characters, and so on to the recording paper P is performed in the following manner. It should be noted that as an initial state, it is assumed that the four types of ink tanks 3 (3Y, 3M, 3C, and 3K) shown in FIG. 1 are sufficiently filled with the ink 9 of the corresponding colors (the four colors), respectively. Further, there is achieved the state in which the inkjet heads 4 are filled with the ink 9 in the ink tanks 3 via the ink supply tubes 30, respectively.

In such an initial state, when making the printer 1 operate, the grit rollers 21 in the carrying mechanisms 2*a*, 2*b* each rotate to thereby carry the recording paper P along the carrying direction d (the X-axis direction) between the grit rollers 21 and the pinch rollers 22. Further, at the same time as such a carrying operation, the drive motor 633 in the drive mechanism 63 rotates each of the pulleys 631*a*, 631*b* to thereby operate the endless belt 632. Thus, the carriage 62 reciprocates along the width direction (the Y-axis direction) of the recording paper P while being guided by the guide rails 61*a*, 61*b*. Then, on this occasion, the four colors of ink 9 are appropriately ejected on the recording paper P by the respective inkjet heads 4 (4Y, 4M, 4C, and 4K) to thereby perform the recording operation of images, characters, and so on to the recording paper P.

(B. Detailed Operation in Inkjet Head 4)

Then, the detailed operation (a jet operation of the ink 9) in the inkjet head 4 will be described. Specifically, in this inkjet head 4, the jet operation of the ink 9 using a shear mode is performed in the following manner.

First, the driver 49 applies the drive voltages Vd (the drive signal Sd) to the drive electrodes (the common electrodes and the active electrodes) described above in the actuator plate 42 (see FIG. 2 and FIG. 3). Specifically, the driver 49 applies the drive voltage Vd to each of the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 41 (or timing in the vicinity of that timing). Thus, the drive walls are restored from the state of the flexion deformation described above, and as a result, the volume of the ejection channel having once increased is restored again.

In such a manner, the pressure in the ejection channel increases in the process that the volume of the ejection channel is restored, and thus, the ink 9 in the ejection channel is pressurized. As a result, the ink 9 having a droplet shape is ejected (see FIG. 2 and FIG. 3) toward the outside (toward the recording paper P) through the nozzle hole Hn. The jet operation (the ejection operation) of the ink 9 in the inkjet head 4 is performed in such a manner, and as a result, the recording operation (the printing operation) of images, characters, and so on to the recording paper P is performed.

(C. Operation of Generating Jet Parameters)

Figure 8:
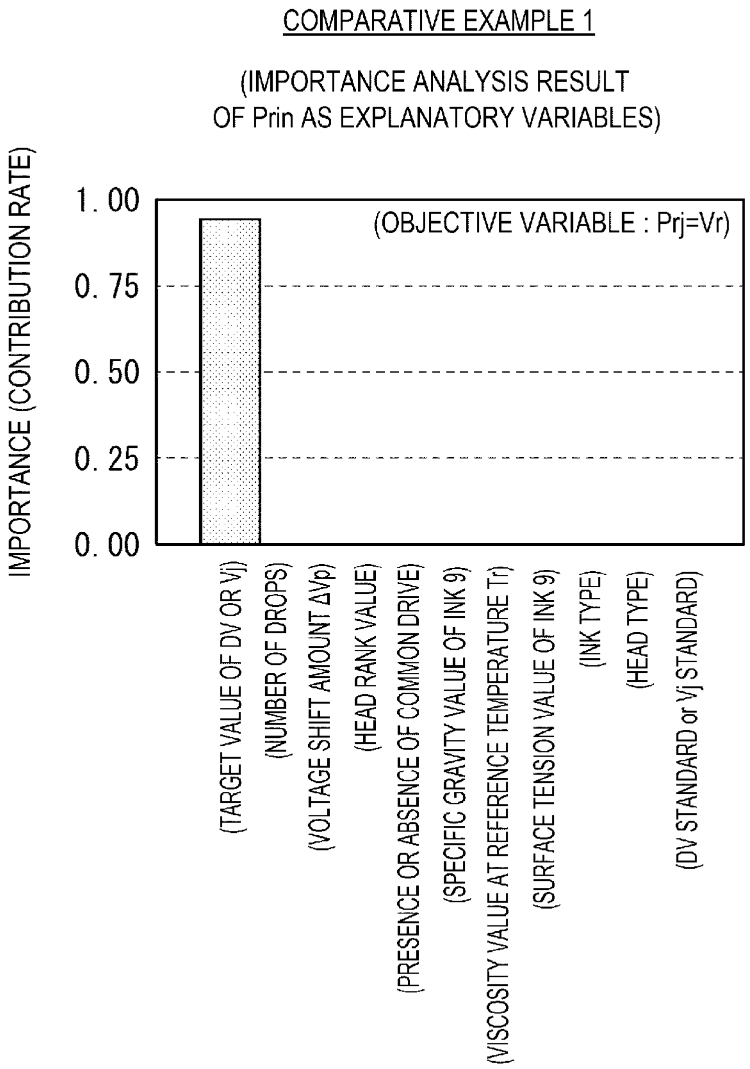
FIG. 8 is a diagram showing an example of an importance analysis result of input parameters related to Comparative Example 1.
Figure 9A:
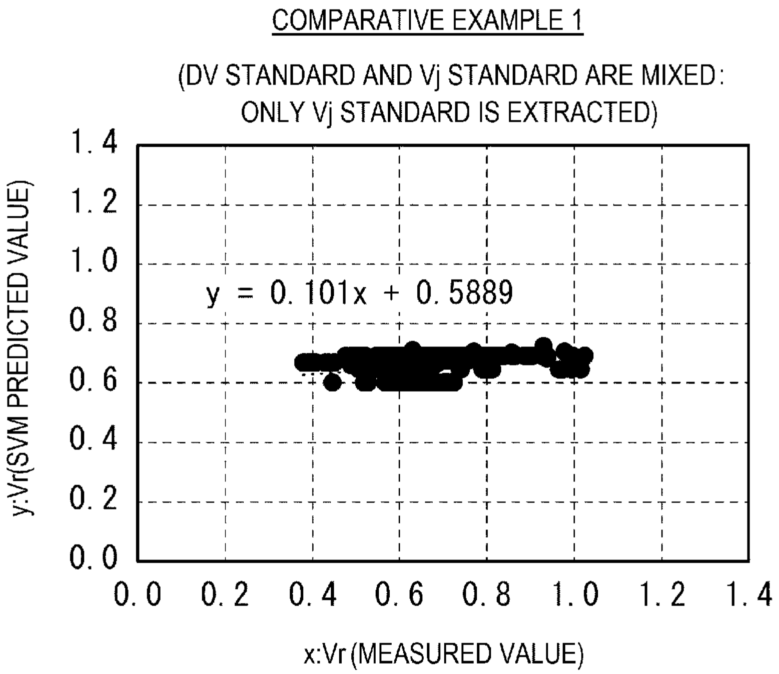
FIG. 9A is a diagram showing an example of a correspondence relationship between an SVM predicted value and a measured value related to Comparative Example 1.
Figure 9B:
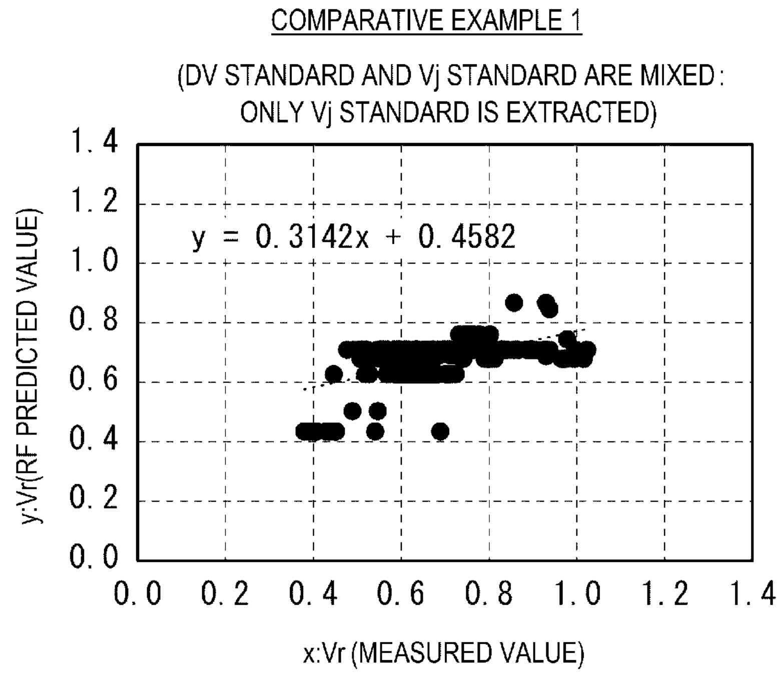
FIG. 9B is a diagram showing an example of a correspondence relationship between an RF predicted value and a measured value related to Comparative Example 1.

Then, an operation of generating (generation processing of) the jet parameters Prj (in the case of the voltage sensitivity Vr described above) in the jet parameter generation system 5 will be described in detail with reference to FIG. 7 through FIG. 13B in addition to FIG. 1 through FIG. 6C while comparing to a comparative example (FIG. 8, FIG. 9A, and FIG. 9B).

Incidentally, the voltage sensitivity Vr (the voltage sensitivity Vr when performing ejection) means a value (unit: [pl/V] or [m/s/V]) corresponding to a variation per unit voltage in the drop volume (DV) or the ejection speed of the ink 9 when the ink 9 is jetted at a reference temperature Tr.

(C-1. Regarding Input Parameters Prin)

First, as the predetermined input parameters Prin described above, there can be cited those listed in (a) through (l) below as an example as shown in FIG. 7. FIG. 7 is a diagram showing an example of the input parameters Prin related to the present embodiment. It should be noted that in FIG. 7, the values of the input parameters Prin are shown with respect to six samples ("sample 1" through "sample 6").

(a) the number of drops (the number of pulses)—corresponding to the number of pulses included in a unit period in the drive signal Sd described above with reference to FIG. 6A through FIG. 6C (b) presence or absence of the common drive ("0": absence, "1": presence, "2": a special value)—a so-called common drive (a drive method of setting the pulse of the drive signal Sd so as to include a change in which the volume of the ejection channel is contracted from a standard value when ejecting the ink 9)

(c) a head type—a symbol or the like representing a type of the inkjet heads 4

(d) an ink type—a type of the ink 9 classified in accordance with a chief solvent of the ink 9 ("Oil": the ink 9 with an oil solvent, "sol": the ink 9 with an organic solvent, "UV": UV (ultraviolet) curable ink, and "WB": the Water Base (with water as the chief solvent) ink 9)

(e) DV standard or Vj standard—a parameter representing which one of a standard ("DV standard") for setting the voltage value Vp with which the drop volume of the ink 9 to be the standard can be obtained when the ink 9 is jetted and a standard ("Vj standard") for setting the voltage value Vp with which the ejection speed to be the standard can be obtained is selected (f) a head rank value—a value (unit: [V]) which is inherent in the inkjet head 4, and corresponds to the voltage value Vp with which a predetermined ejection speed is achieved when a predetermined test liquid is jetted from the inkjet head 4

(g) a viscosity value at the reference temperature Tr—a viscosity value (unit: [mPa]) of the ink 9 at the reference temperature Tr when using the ink 9 while heated (h) a surface tension value of the ink 9 (unit: [mN/m])

(i) a specific gravity value of the ink 9 (or a physical property value (e.g., a density of the ink 9 or a sound speed in the ink 9) which can be obtained using the specific gravity value of the ink 9)

(j) a target value of the DV (drop volume) or the Vj (the ejection speed) of the ink 9

(k) voltage shift amount $\Delta Vp$ (a parameter used in the predetermined conversion processing described above; described later in detail in Modified Example 1)

Incidentally, the "viscosity of the ink 9" mentioned here means static viscosity, which applies to the following. Further, such a viscosity value of the ink 9 is configured to be measured using, for example, a rotary viscometer, a vibratory viscometer, or a viscometer (a viscometer capable of measuring static viscosity) of other measuring methods such as a canalicular type or a falling-ball type.

(C-2. Comparative Example 1)

Here, FIG. 8 is a diagram showing an example of an importance analysis result of the input parameters Prin related to Comparative Example 1. Further, FIG. 9A is a diagram showing an example (an example when extracting only the Vj standard described above) of a correspondence relationship between an SVM predicted value and a measured value related to Comparative Example 1. Similarly, FIG. 9B is a diagram showing an example (an example when extracting only the Vj standard described above) of a correspondence relationship between an RF predicted value and a measured value related to Comparative Example 1. Comparative Example 1 corresponds to when using the predetermined analytical method described above in a condition in which both of the DV standard and the Vj standard described above are mixed with each other although the details will be described later.

It should be noted that the importance in the importance analysis result shown in FIG. 8 means an index (a contribution rate) for measuring how much the division of the feature amount thereof makes a contribution to the classification of the target, and is configured to be calculated using a predetermined calculating formula based on so-called Gini impurity. Such a definition of the importance also applies to the following.

Further, in the examples shown in FIG. 9A and FIG. 9B, the (x,y) coordinate in each of a number of (562) samples is plotted when defining the measured value of the voltage sensitivity Vr as a variable x, and defining the predicted value (the SVM predicted value or the RF predicted value) of the voltage sensitivity Vr as a variable y. Further, in FIG. 9A and FIG. 9B, an example of a formula (e.g., a linear function formula identified using a least-square method) representing the tendency of the correlative relationship between these variables x, y is also shown.

First, according to an example of the importance analysis result of the input parameters Prin as the explanatory variables shown in FIG. 8, the following is the highest in importance (contribution rate) when generating the jet parameter Prj (=the voltage sensitivity Vr) using the machine learning model 74. That is, the importance is the highest in (j) the target value of DV or Vj out of the input parameters Prin shown in (a) through (l) described above. Further, regarding other input parameters Prin out of such input parameters Prin, the importance is set nearly "0(zero)."

Therefore, in Comparative Example 1, the predetermined analytical method described above is used in the condition in which both of the DV standard and the Vj standard are mixed with each other using only (j) the target value of DV or Vj as the input parameter Prin.

Then, as shown in, for example, FIG. 9A and FIG. 9B, in Comparative Example 1, there can occur the case in which the prediction accuracy when generating the jet parameter Prj degrades. Specifically, in the examples (the examples when extracting only the Vj standard) shown in FIG. 9A and FIG. 9B, a gradient in the linear function formula described above is set nearly "0," and at the same time, an intercept in the linear function formula described above is set significantly greater than "0." Therefore, in each of the examples shown in FIG. 9A and FIG. 9B, the predicted values (the SVM predicted value and the RF predicted value) and the measured value have the following relationship. That is, it results in that it cannot be said that the predicted value and the measured value have a sufficient correlative relationship when performing printing using the predicted value.

In such a manner, in Comparative Example 1, as described above, when performing the importance analysis in the condition in which both of the DV standard and the Vj standard are mixed with each other, the importance (a degree of contribution) becomes characteristically high in some cases in a specific input parameter Prin out of the input parameters Prin. Further, in such a case, when using the predetermined analytical method using only the specific input parameter Prin characteristically high in importance as described above, for example, the prediction accuracy of the jet parameter Prj in, for example, the DV standard or the Vj standard degrades in some cases. Specifically, in each of the examples shown in FIG. 9A and FIG. 9B, the prediction accuracy of the jet parameter Prj in the Vj standard has degraded. As a result, in Comparative Example 1, there is a possibility that the convenience of the user degrades.

(C-3. Processing of Generating Jet Parameters Prj in Present Embodiment)

Therefore, in the jet parameter generation system 5 in the present embodiment, it is configured that which one of the DV standard and the Vj standard is to be selected is determined based on the selection instruction signal Ss described above when generating the jet parameters Prj. The processing of generating the jet parameters Prj in the present embodiment will hereinafter be described in detail.

It should be noted that the DV standard described above corresponds to a specific example of a "first standard" in the present disclosure. Further, the Vj standard described above corresponds to a specific example of a "second standard" in the present disclosure.

Figure 10:
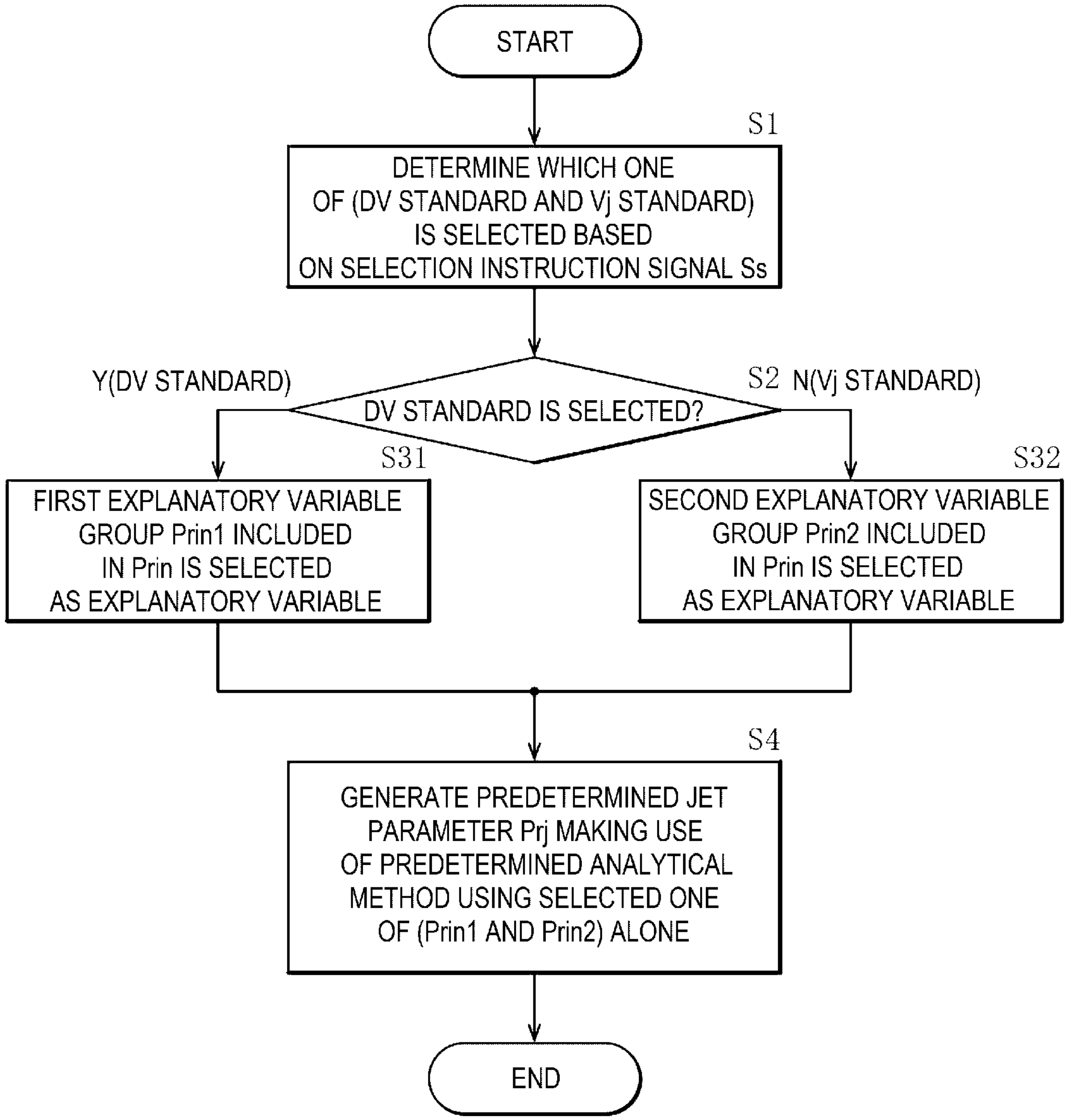
FIG. 10 is a flowchart showing an example of jet parameter generation processing related to the embodiment.

Here, FIG. 10 is a flowchart showing an example of the processing of generating the jet parameters Prj related to the present embodiment.

In the processing example shown in FIG. 10, first, the parameter generation section 732 determines (steps S1, S2) which one of the DV standard and the Vj standard is to be selected based on the selection instruction signal Ss representing which one of the DV standard and the Vj standard described above is selected by the instruction.

Here, when, for example, it is determined that the DV standard is selected (Y in the step S2), the parameter generation section 732 selects (step S31) a first explanatory variable group Print (see FIG. 11A described later) included in the input parameters Prin described above as the explanatory variables in the predetermined analytical method (e.g., the machine learning model 74). In contrast, when, for example, it is determined that the Vj standard is selected (N in the step S2), the parameter generation section 732 selects (step S32) a second explanatory variable group Prin2 (see FIG. 11B described later) included in the input parameters Prin as the explanatory variables in the predetermined analytical method.

Then, the parameter generation section 732 uses the predetermined analytical method (e.g., the machine learning model 74) using one of the first explanatory variable group Print and the second explanatory variable group Prin2 thus selected alone to thereby generate (step S4) the predetermined jet parameters.

This terminates the series of processing shown in FIG. 10.

Figure 11A:
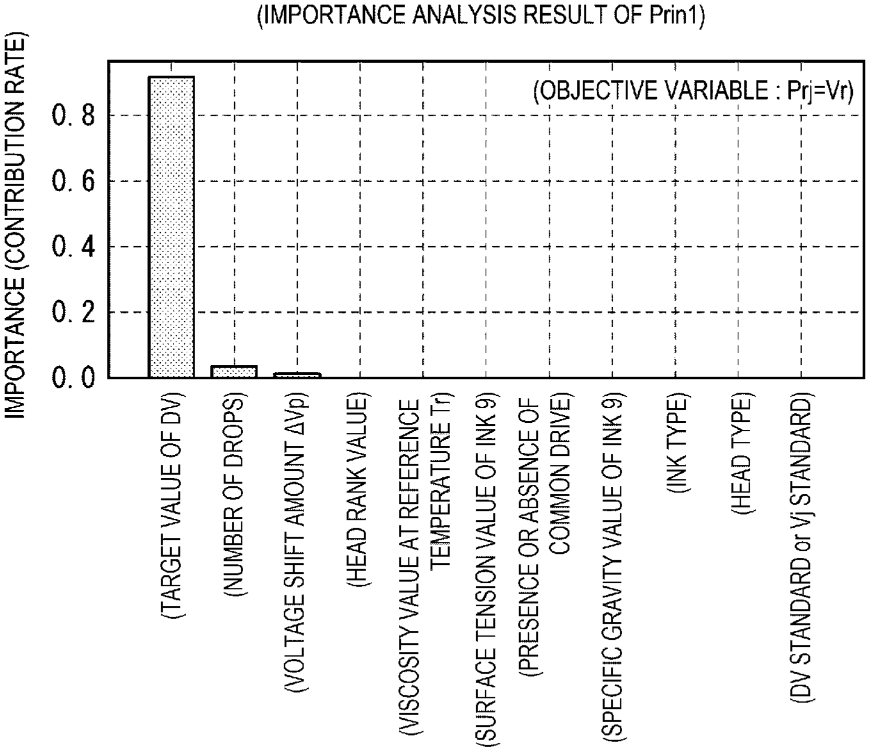
FIG. 11A is a diagram showing an example of an importance analysis result of a first explanatory variable group related to the embodiment.
Figure 11B:
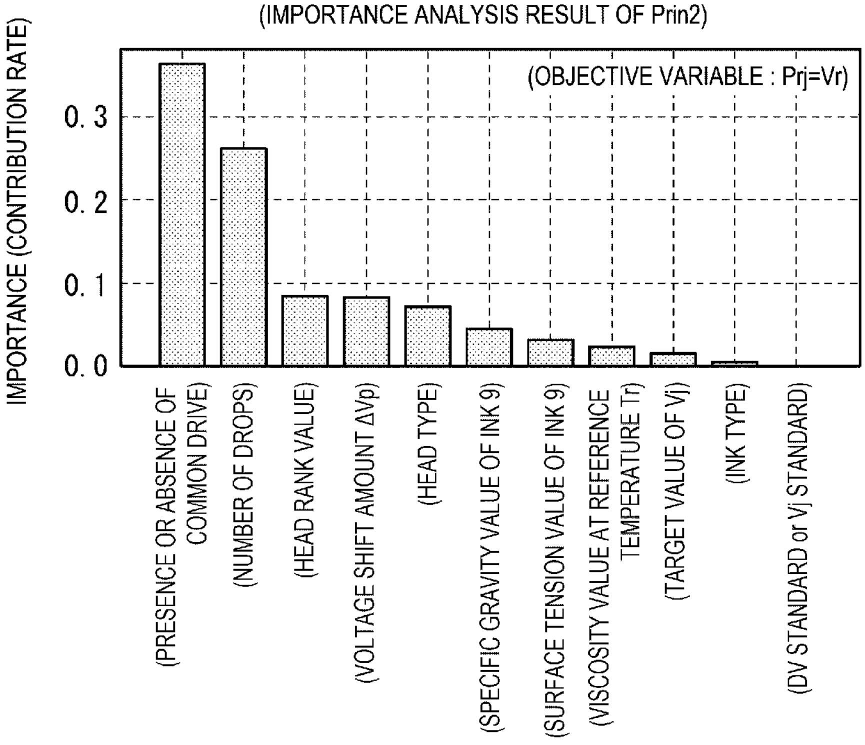
FIG. 11B is a diagram showing an example of an importance analysis result of a second explanatory variable group related to the embodiment.

Here, FIG. 11A is a diagram showing an example of the importance analysis result in the first explanatory variable group Print described above related to the present embodiment. Further, FIG. 11B is a diagram showing an example of the importance analysis result in the second explanatory variable group Prin2 described above related to the present embodiment. It should be noted that the examples shown in FIG. 11A and FIG. 11B represent when the jet parameter Prj as the objective variable is the voltage sensitivity Vr as described above.

As shown in FIG. 11A, as the first explanatory variable group Print related to the present embodiment, there is included, for example, at least one of the following parameters out of the input parameters Prin described above. That is, in the example shown in FIG. 11A, there are mainly included (j) the target value of DV, (a) the number of drops, and (k) the voltage shift amount ΔVp. Further, as shown in FIG. 11A, the importance (the degree of contribution) becomes relatively higher in this order.

Specifically, in the example shown in FIG. 11A, in (j) the target value of DV, the importance becomes relatively higher (the highest). Therefore, in the present embodiment, it is desirable that (j) the target value of DV which is the highest in importance is at least included as the first explanatory variable group Print described above. Further, in the present embodiment, as described above, it can be said that it is desirable that at least one of (a) the number of drops and (k) the voltage shift amount ΔVp which are the second highest and the third highest in importance is further included as the first explanatory variable group Print.

In contrast, as shown in FIG. 11B, as the second explanatory variable group Prin2 related to the present embodiment, there is included, for example, at least one of the following parameters out of the input parameters Prin described above. Specifically, in the example shown in FIG. 11B, there are mainly included (b) presence or absence of common drive, (a) the number of drops, (f) a head rank value, (k) the voltage shift amount ΔVp, (c) a head type, (i) a specific gravity value of the ink 9, (h) a surface tension value of the ink 9, (g) a viscosity value at a reference temperature Tr, (j) the target value of Vj, and (d) an ink type. Further, as shown in FIG. 11B, the importance (the degree of contribution) becomes relatively higher in this order.

Specifically, in the example shown in FIG. 11B, in (b) the presence or absence of the common drive and (a) the number of drops, the importance becomes relatively higher (the highest, the second highest), respectively. Therefore, in the present embodiment, it is desirable for at least one of (b) the presence or absence of the common drive and (a) the number of drops which have become relatively high in importance to be at least included as the second explanatory variable group Prin2 described above. Further, in the present embodiment, as described above, it can be said that it is desirable for at least one of (f) the head rank value, (k) the voltage shift amount ΔVp, (c) the head type, (i) the specific gravity value of the ink 9, (h) the surface tension value of the ink 9, (g) the viscosity value at the reference temperature Tr, and (j) the target value of Vj which are the next highest after the parameters described above (the third highest through the ninth highest) to further be included as the second explanatory variable group Prin2.

Figure 12A:
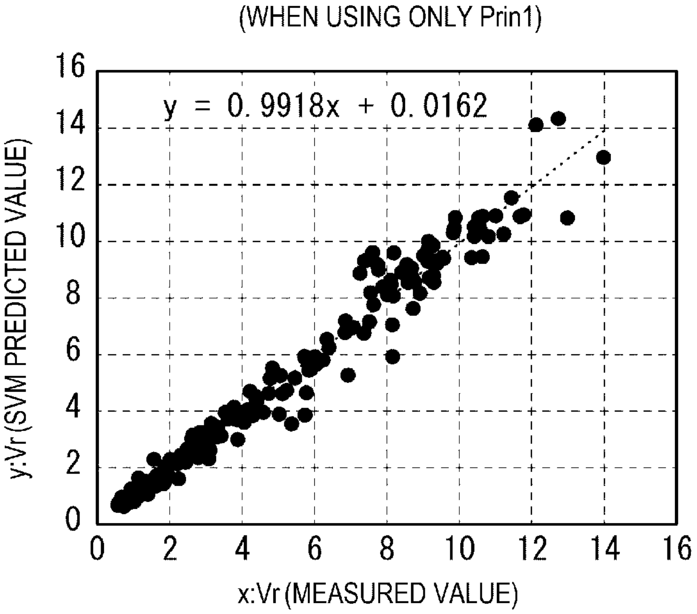
FIG. 12A is a diagram showing an example of a correspondence relationship between the SVM predicted value and the measured value when using only the first explanatory variable group shown in FIG. 11A.
Figure 12B:
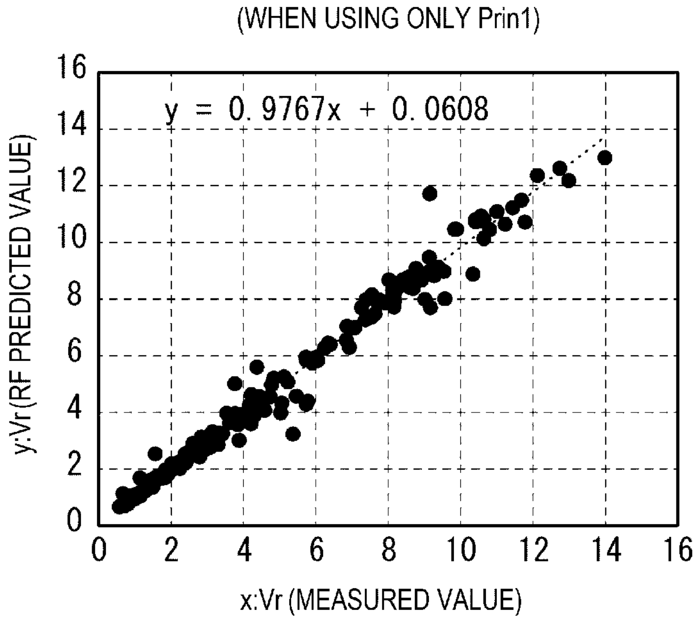
FIG. 12B is a diagram showing an example of a correspondence relationship between the RF predicted value and the measured value when using only the first explanatory variable group shown in FIG. 11A.
Figure 13A:
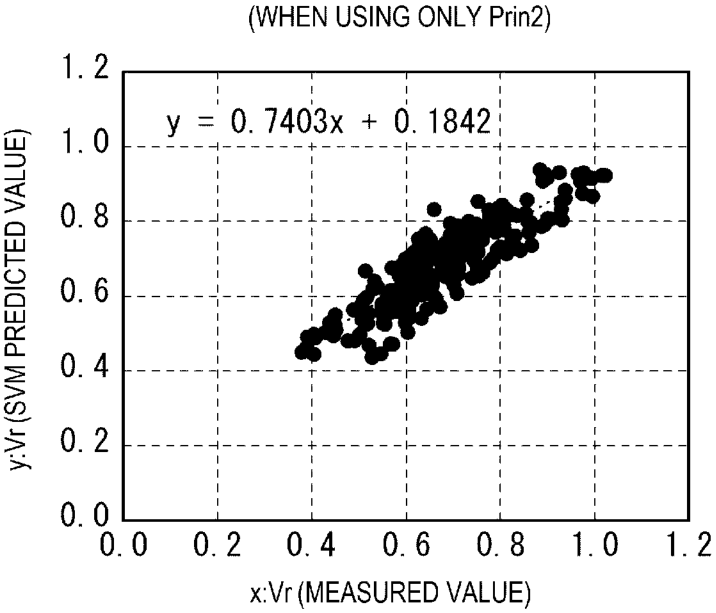
FIG. 13A is a diagram showing an example of a correspondence relationship between the SVM predicted value and the measured value when using only the second explanatory variable group shown in FIG. 11B.
Figure 13B:
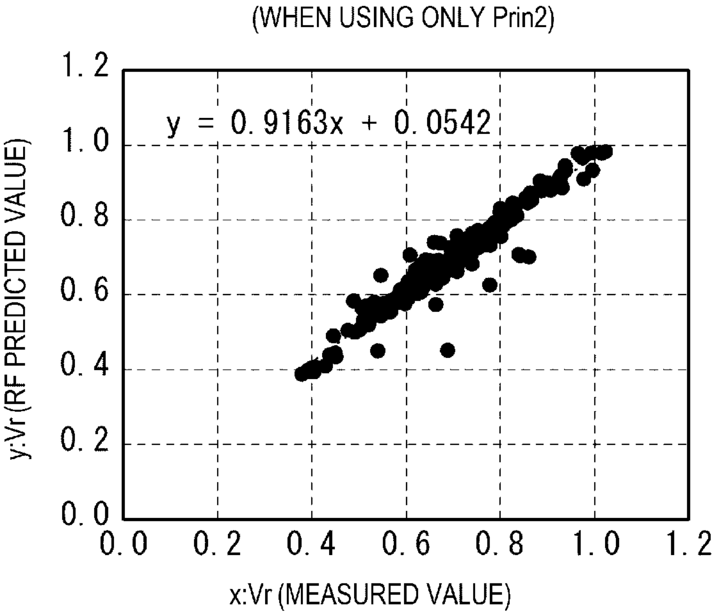
FIG. 13B is a diagram showing an example of a correspondence relationship between the RF predicted value and the measured value when using only the second explanatory variable group shown in FIG. 11B.

Here, FIG. 12A and FIG. 12B are each a diagram showing an example of a correspondence relationship between the predicted value (the SVM predicted value, the RF predicted value) and the measured value when using only the first explanatory variable group Print shown in FIG. 11A. Further, FIG. 13A and FIG. 13B are each a diagram showing an example of a correspondence relationship between the predicted value (the SVM predicted value, the RF predicted value) and the measured value when using only the second explanatory variable group Prin2 shown in FIG. 11B.

It should be noted that the details of these drawings, namely FIG. 12A, FIG. 12B, FIG. 13A, and FIG. 13B, are substantially the same as the case of FIG. 9A, FIG. 9B described above. Specifically, in each of the examples shown in FIG. 12A, FIG. 12B, FIG. 13A, and FIG. 13B, the (x,y) coordinate in each of a number of (562) samples is plotted when defining the measured value of the voltage sensitivity Vr as a variable x, and defining the predicted value (the SVM predicted value or the RF predicted value) of the voltage sensitivity Vr as a variable y. Further, in FIG. 12A, FIG. 12B, FIG. 13A, and FIG. 13B described above, an example of a formula (e.g., a linear function formula identified using the least-square method) representing the tendency of the correlative relationship between these variables x, y is also shown.

In each of the examples shown in FIG. 12A, FIG. 12B, FIG. 13A, and FIG. 13B described above, the gradient in the formula of the linear function described above is made nearly "1," and at the same time, the intercept in the formula of this linear function is made nearly "0" unlike the case (FIG. 9A, FIG. 9B) of Comparative Example 1 described above. Therefore, in the present embodiment, unlike Comparative Example 1 described above, regarding the voltage sensitivity Vr as the objective variable, the predicted values (the SVM predicted value and the RF predicted value) and the measured value are in the following relationship. That is, it is understood that the predicted value and the measured value have a sufficient correlative relationship to the extent that the predicted value is practicable when performing printing using the predicted value.

(D. Functions/Advantages)

In such a manner as described above, in the jet parameter generation system 5 according to the present embodiment, which one of the DV standard and the Vj standard described above is selected is determined based on the selection instruction signal Ss. Further, since the jet parameters Prj are generated by using the predetermined analytical method described above using just one of the first explanatory variable group Print and the second explanatory variable group Prin2 selected in accordance with such a determination result of the standard, the following is achieved.

In other words, there is avoided such a degradation of the prediction accuracy of the jet parameters Prj as in, for example, the case (when using the predetermined analytical method in the condition in which both of the DV standard and the Vj standard are mixed with each other) of Comparative Example 1 described above. In other words, in the present embodiment, it is possible to increase the prediction accuracy of the jet parameter Prj compared to the case of Comparative Example 1 described above. As a result, in the present embodiment, it becomes possible to enhance the convenience of the user.

Further, in the present embodiment, since at least the voltage sensitivity Vr described above is included as such jet parameter Prj, the following is achieved. In other words, it becomes possible to increase the prediction accuracy of the voltage sensitivity Vr compared to the case of Comparative Example 1 described above when generating the voltage sensitivity Vr using the predetermined analytical method.

Further, in the present embodiment, since at least the target value of DV described above is included as the first explanatory variable group Print, and at the same time, at least one of the parameter representing the presence or absence of the common drive described above and the parameter representing the number of drops is included as the second explanatory variable group Prin2, the following is achieved. In other words, since the voltage sensitivity Vr is generated using the parameter the highest in importance (degree of contribution) or the parameter the second highest in importance (degree of contribution) when generating the voltage sensitivity Vr using the predetermined analytical method, it becomes possible to further increase the prediction accuracy of the voltage sensitivity Vr.

In addition, in the present embodiment, since the number of drops is further included as the first explanatory variable group Print, and at the same time, at least one of the parameters of the head rank value, the head type, the specific gravity value of the ink 9, the surface tension value of the ink 9, the viscosity value at the reference temperature Tr, and the target value of DV is further included as the second explanatory variable group Prin2, the following is achieved. In other words, since the voltage sensitivity Vr is generated further using these parameters relatively high in importance (degree of contribution) when generating the voltage sensitivity Vr using the predetermined analytical method, it becomes possible to further increase the prediction accuracy of the voltage sensitivity Vr.

Further, in the present embodiment, since the voltage shift amount ΔVp described above is included as at least one of the first explanatory variable group Print and the second explanatory variable group Prin2, the following is achieved. In other words, it becomes possible to further increase the prediction accuracy of the voltage sensitivity Vr when generating the voltage sensitivity Vr using the predetermined analytical method.

Further, in the present embodiment, since there is adopted the method of using the machine learning model 74 as the predetermined analytical method, it becomes possible to easily and accurately generate the jet parameters Prj.

In addition, in the present embodiment, since it is configured to further dispose the table generation section 733 and the signal generation section 48 in the jet parameter generation system 5, the following is achieved. That is, it results in that the predictive voltage characteristic table TPvp is generated using at least one of the generated jet parameters Prj, and at the same time, the voltage value Vp (the crest value) of the pulse is obtained using the predictive voltage characteristic table TPvp generated in such a manner, and the drive signal Sd is generated using the pulse having the voltage value Vp. Therefore, since the jet operation of the ink 9 is performed using the drive signal Sd generated in such a manner, it is possible to easily improve the ejection characteristic of the ink 9. As a result, it becomes possible to further enhance the convenience of the user.

In addition, in the present embodiment, since it is configured that the data acquisition section 731, the parameter generation section 732, and the table generation section 733 described above are each disposed outside (in the information processing device 7) the printer 1, the following is achieved. That is, it is possible to perform an automatic generation of the jet parameters Prj and the predictive voltage characteristic table TPvp in the information processing device 7 described above while keeping the existing configuration with respect to the inkjet heads 4 and the printer 1. As a result, it becomes possible to further enhance the convenience of the user.

2. MODIFIED EXAMPLES

Then, some modified examples (Modified Example 1 through Modified Example 6) of the embodiment described above will be described. It should be noted that the same constituents as those in the embodiment described above are denoted by the same reference symbols, and the description thereof will arbitrarily be omitted.

Modified Example 1

In the embodiment described above, there is described when at least the voltage sensitivity Vr is included as the predetermined jet parameters Prj. In contrast, in Modified Example 1 described below, there is described an example of the case including at least a conversion coefficient Kc in the predetermined conversion processing described above as the predetermined jet parameters Prj. In other words, the conversion coefficient Kc corresponds to a specific example of the "predetermined jet parameter" in the present disclosure.

Here, the predetermined conversion processing described above is conversion processing from a measured characteristic curve CMvi to a predictive characteristic curve CPvp. Further, the measured viscosity characteristic table TMvi means a characteristic table defining the measured characteristic curve CMvi between the viscosity Vi of the ink 9 and an ambient temperature Ta although the details will be described later. Further, the predictive voltage characteristic table TPvp is a characteristic table for defining the predictive characteristic curve CPvp between the voltage value Vp representing the crest value of the pulse of the drive signal Sd based on a predetermined standard value and the ambient temperature Ta although the details will be described later. It should be noted that the details will be described later.

(A. Configuration)

Figure 14:
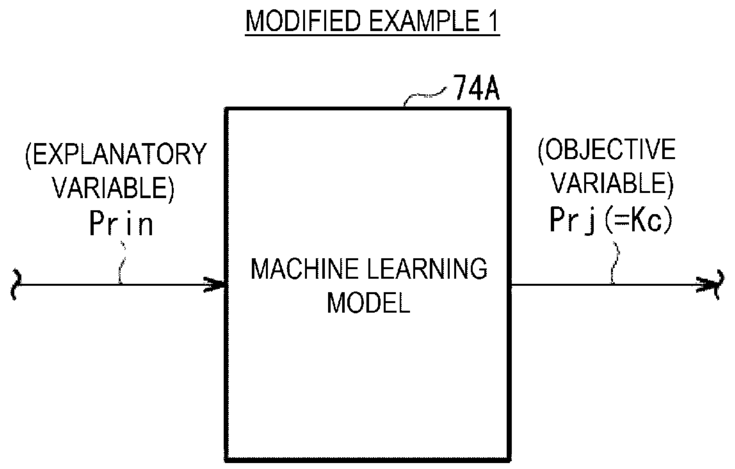
FIG. 14 is a block diagram showing a configuration example of a machine learning model related to Modified Example 1.

FIG. 14 is a block diagram showing a configuration example of a machine learning model (a machine learning model 74A) related to Modified Example 1. The machine learning model 74A is a predictive model obtained by performing the machine learning taking the input parameters Prin as the explanatory variables and taking the jet parameter Prj as the objective variable similarly to the machine learning model 74 described in the embodiment. Further, as shown in FIG. 14, the machine learning model 74A is configured to generate (predict) the jet parameter Prj (the objective variable) based on a learning result, and then output the jet parameter Prj thus generated when the input parameters Prin (the explanatory variables) are input. Then, as described above, the machine learning model 74A generates the predetermined jet parameter Prj so as to include at least the conversion coefficient Kc described above as an example (see FIG. 14).

Such a machine learning model 74A is configured to be used in the parameter generation section 732 similarly to the embodiment. Specifically, the parameter generation section 732 in Modified Example 1 is configured to generate the jet parameter Prj (the conversion coefficient Kc or the like) based on the input parameters Prin using the analytical method using the machine learning model 74A. It should be noted that a specific example of the analytical method (a prediction method) using such a machine learning model 74A is substantially the same as that cited in the embodiment.

(B. Regarding Details of Conversion Processing, Etc.)

Here, the details of the predetermined conversion processing described above, the measured viscosity characteristic table TMvi, and the predictive voltage characteristic table TPvp will hereinafter be described while citing a comparative example (Comparative Example 2). Further, the details of processing in the information processor 73 (the data acquisition section 731, the parameter generation section 732, and the table generation section 733) described in the embodiment will also be described.

B-1. Comparative Example 2

Figure 15:
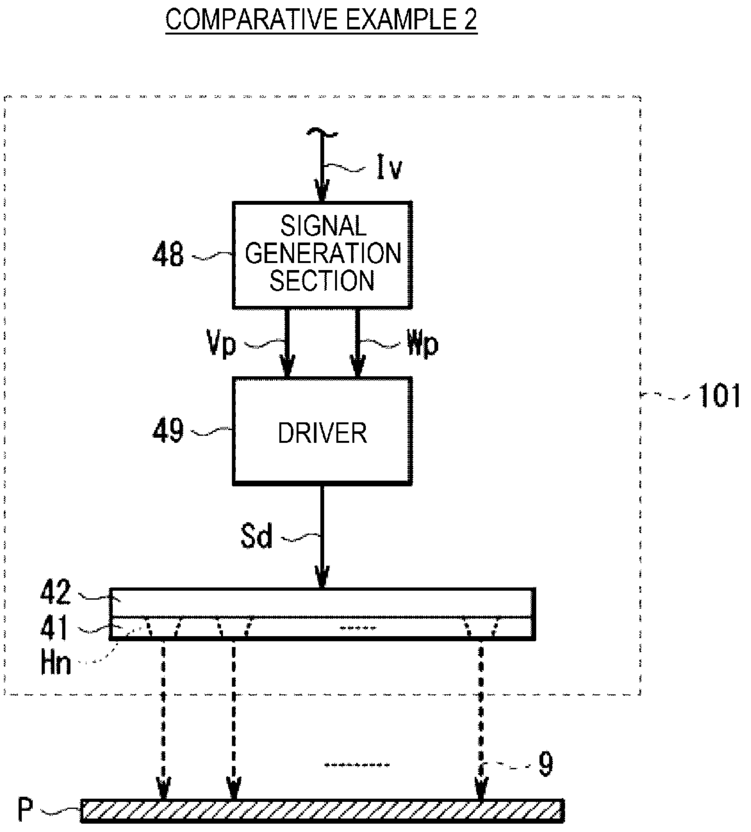
FIG. 15 is a block diagram showing a schematic configuration example of a liquid jet recording device according to Comparative Example 2.

FIG. 15 is a block diagram showing a schematic configuration example of a printer 101 as a liquid jet recording device according to Comparative Example 2. The printer 101 in the comparative example is provided with the nozzle plate 41, the actuator plate 42, the signal generation section 48, and the driver 49 described above in an inkjet head or the like in Comparative Example 2 not shown.

It should be noted that in the printer 101 of Comparative Example 2, unlike the printer 1 according to the embodiment, the signal generation section 48 is configured to set the voltage value Vp using viscosity information Iv described hereinafter instead of the predictive voltage characteristic table TPvp described above.

Figure 16:
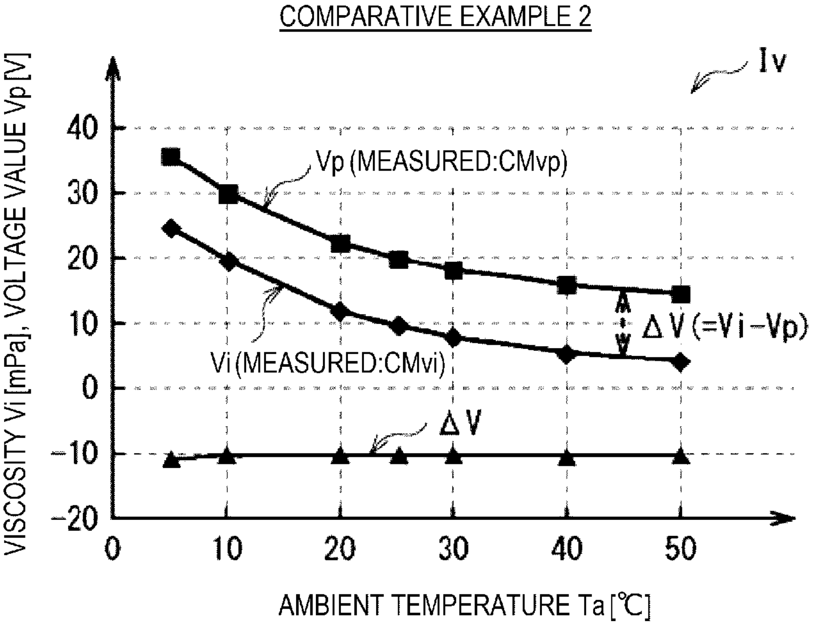
FIG. 16 is a diagram showing an example of viscosity information related to Comparative Example 2.

FIG. 16 shows an example of the viscosity information Iv related to such Comparative Example 2. Specifically, in FIG. 16, there is shown an example of a correspondence relationship (information including the viscosity information Iv) between the ambient temperature Ta and the viscosity Vi (measured value) of the ink 9, between the ambient temperature Ta and the voltage value Vp (measured values) in the pulse of the drive signal Sd, and between the ambient temperature Ta and a difference value ΔV (=Vi−Vp) between the viscosity Vi and the voltage value Vp. In other words, in the example shown in FIG. 16, there are shown a characteristic curve (a measured characteristic curve CMvi) between the viscosity Vi (measured values) and the ambient temperature Ta, a characteristic curve (a measured characteristic curve CMvp) between the voltage value Vp (measured value) and the ambient temperature Ta, and a characteristic curve between the difference value ΔV described above and the ambient temperature Ta.

It should be noted that the ambient temperature Ta described above corresponds to a specific example of the "temperature" in the present disclosure.

In Comparative Example 2, first, it is configured that such viscosity information Iv as shown in FIG. 16 can be obtained by detecting (performing the measurement at a plurality of points such as no less than 5 points) a change in viscosity Vi of the ink 9 with respect to a change in the ambient temperature Ta. Further, it has been known that the change in the viscosity Vi of the ink 9 with respect to the ambient temperature Ta, and the change in the voltage value Vp (the voltage value Vp with which a standard ejection speed can be obtained) with respect to the ambient temperature Ta show respective variation characteristics similar to each other as shown in, for example, FIG. 16. Therefore, the difference value ΔV between the viscosity Vi and the voltage value Vp is configured to show a substantially constant value without depending on the ambient temperature Ta as shown in, for example, FIG. 16.

Further, as shown in FIG. 16, the signal generation section 48 in Comparative Example 2 subtracts the difference value ΔV (a negative value) calculated in advance from a value of the viscosity Vi (see the viscosity information Iv) at a certain ambient temperature Ta to thereby obtain the voltage value Vp with which the standard ejection speed can be obtained using such similarity in variation characteristic with temperature. In other words, the signal generation section 48 in Comparative Example 2 uses the relational expression (see FIG. 16) of Vp=(Vi−ΔV) to thereby obtain the voltage value Vp at a certain ambient temperature Ta.

Incidentally, the characteristic curve (the measured characteristic curve CMvp described above) between the voltage value Vp and the ambient temperature Ta generally becomes a curve having the gradient differing in accordance with a type of the number of pulses included in the drive signal Sd, a class or a role of each of the pulses (a class and a role of each of the pulses including an additional pulse such as an auxiliary pulse), and so on. Therefore, in Comparative Example 2, it is necessary to obtain such a measured characteristic curve CMvp by basically performing a measurement manually in advance. It should be noted that it is possible to derive such a measured characteristic curve CMvp without performing the actual measurement in a limited condition (e.g., the case of "one drop" described above based on the ejection speed).

It is necessary to obtain the measured characteristic curve CMvp described above in such a manner by performing the actual measurement, for example, for each of the types of the number of pulses included in the drive signal Sd. Therefore, an immense amount of time and trouble is required for the user of the printer 101 in Comparative Example 2, and the work burden and the operation cost increase as a result.

Figure 17:
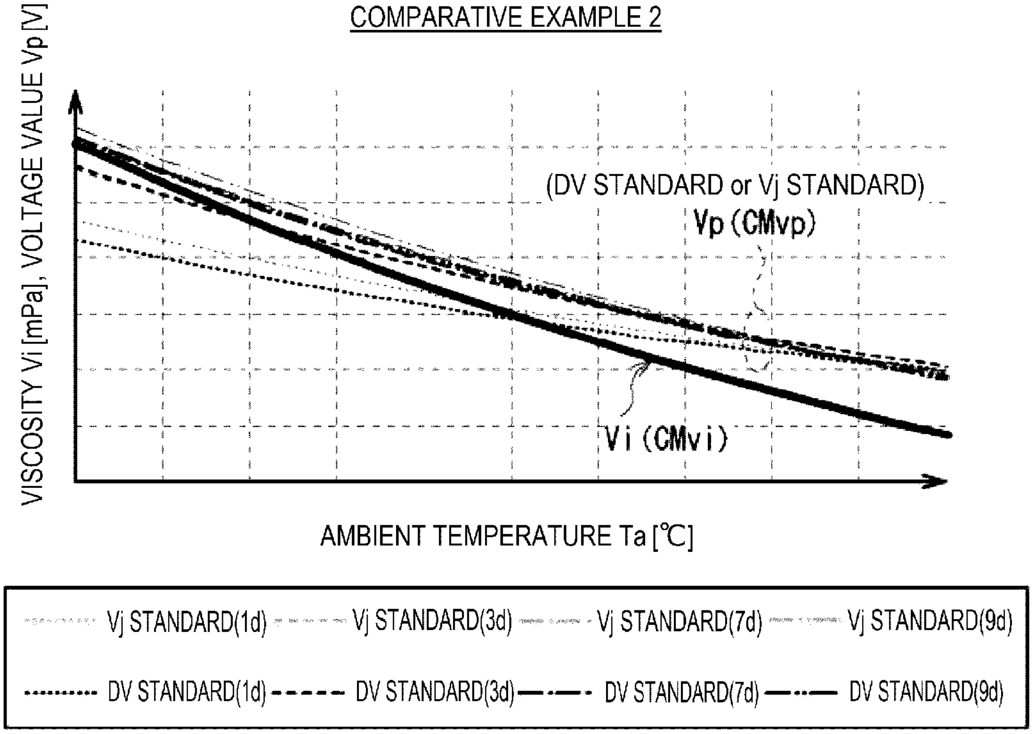
FIG. 17 is a diagram showing an example of a variety of characteristic curves related to Comparative Example 2.

Here, FIG. 17 is a diagram showing an example of a variety of characteristic curves (the measured characteristic curve CMvp and the measured characteristic curve CMvi) related to Comparative Example 2. Specifically, in the measured characteristic curves CMvp shown in FIG. 17, there are shown the cases in which the number of pulses described above (the number of drops described above) is one (described as "1d"), three (described as "3d"), seven (described as "7d"), and nine (described as "9d"), respectively. Further, in each of the measured characteristic curves CMvp shown in FIG. 17, there is shown the voltage value Vp based on a predetermined standard value. In other words, in the measured characteristic curves CMvp shown in FIG. 9, there are shown the voltage value Vp (described as "Vj standard") with which the standard ejection speed can be obtained when the ink 9 is jetted, and the voltage value Vp (described as "DV standard") with which a standard drop volume (DV) of the ink 9 can be obtained when the ink 9 is jetted. It should be noted that the drive waveforms when obtaining the variety of characteristic curves shown in FIG. 17 include the case of "common drive" described later with respect to all of the conditions (the number of drops).

In the example shown in FIG. 17, as described above, the gradient and so on of the measured characteristic curve CMvp differ in accordance with the type of the number of pulses (the number of drops) and the type (the Vj standard or the DV standard described above) of the predetermined standard value described above. Therefore, when arranging that the single measured characteristic curve CMvp is used in two or more cases when generating the drive signal Sd as in the case of the viscosity information Iv in Comparative Example 2 shown in, for example, FIG. 16, the setting accuracy of the voltage value Vp degrades as a result due to a difference in gradient corresponding to the type of the number of pulses, the type of the predetermined standard value, the class, the role, and so on of the pulses described above. Therefore, it becomes difficult to accurately set the voltage value Vp (the crest value) of the pulse in the drive signal Sd.

Specifically, in Comparative Example 2, a single voltage characteristic table (the case of "one drop" based on the ejection speed and so on as described above) can only be generated based on, for example, the measured characteristic curve CMvi as a result. Further, as described above, in order to obtain the measured characteristic curves CMvp of the respective conditions (for the types of the number of pulses and so on), the immense amount of trouble is required for the measurement. With all these factors, in the method of Comparative Example 2, there is a possibility that the convenience of the user is impaired due to the degradation of the setting accuracy of the voltage value Vp described above, the increase in work burden of the user, and so on.

B-2. Method of Modified Example 1

Therefore, in Modified Example 1, the conversion coefficient Kc when performing the conversion processing described hereinafter is generated using the predetermined analytical method described above in the information processor 73 (a program 730) described above. Further, in Modified Example 1, it is configured that the characteristic table described above (the predictive voltage characteristic table TPvp for defining the predictive characteristic curve CPvp) is generated at any time (is automatically generated) using the conversion coefficient Kc generated in such a manner.

Figure 18:
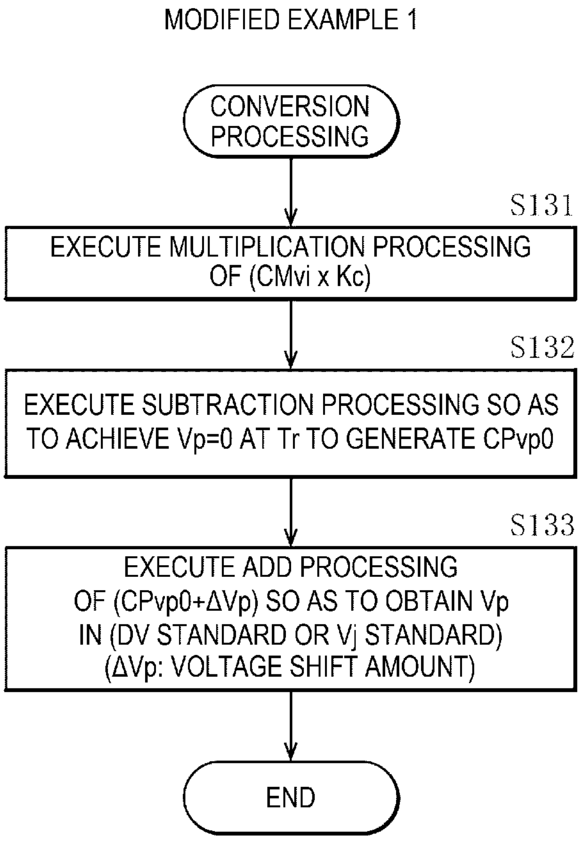
FIG. 18 is a flowchart showing an example of conversion processing related to Modified Example 1.
Figure 19:
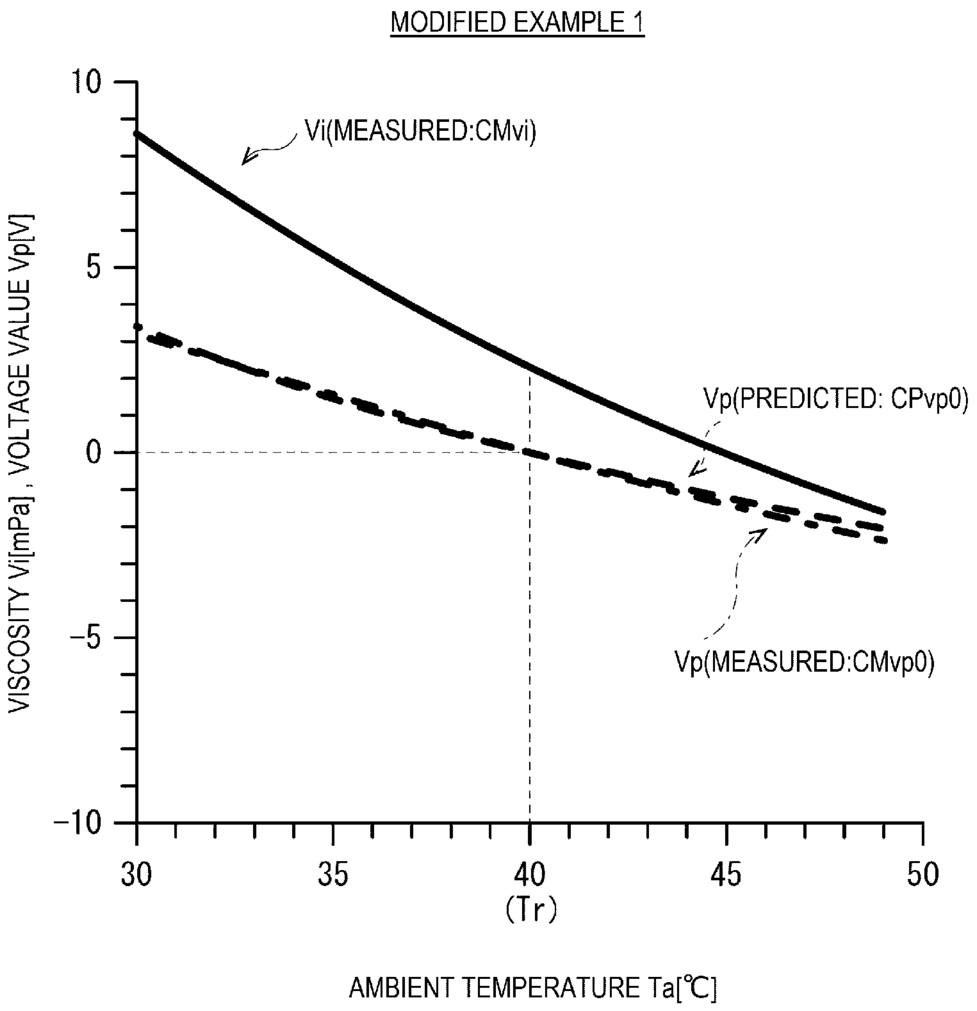
FIG. 19 is a diagram showing an example of a variety of characteristic curves related to Modified Example 1.

Here, FIG. 18 is a flowchart showing an example (corresponding to a specific example of processing in the step S13 in FIG. 21 described later) of the conversion processing described later according to Modified Example 1. Further, FIG. 19 shows an example of a variety of characteristic curves (characteristic curves after executing the step S132 described later shown in FIG. 18) related to Modified Example 1. Specifically, FIG. 19 shows an example of a variety of characteristic curves (the measured characteristic curve CMvi, a preliminary characteristic curve CPvp0 of the predictive characteristic curve CPvp described above, and so on) representing a correspondence relationship between the viscosity Vi [mPa] of the ink 9 or the voltage value Vp, and the ambient temperature Ta [° C.].

It should be noted that a preliminary characteristic curve CMvp0 shown in FIG. 19 for the sake of convenience forms a characteristic curve obtained by performing predetermined processing (processing for achieving the voltage value Vp=0 at a predetermined reference temperature Tr described later) on the measured characteristic curve CMvp described above so as to easily be compared (in gradient) with the preliminary characteristic curve CPvp0 described above.

Further, FIG. 20 is a diagram showing an example of the input parameters Prin related to Modified Example 1. It should be noted that in FIG. 20, the values of the input parameters Prin are shown with respect to six samples ("sample 1" through "sample 6").

(Regarding Conversion Processing)

First, as shown in, for example, FIG. 18 and FIG. 19, the conversion processing using the conversion coefficient Kc means the processing of converting the measured characteristic curve CMvi into the predictive characteristic curve CPvp as described above. Further, as shown in the example in FIG. 19, it is understood that the preliminary characteristic curve CPvp0 obtained in such conversion processing coincides with accuracy (substantially coincides) with the preliminary characteristic curve CMvp0 with respect to the measured characteristic curve CMvp described above.

Here, a specific example of such conversion processing will be described with reference to FIG. 18 and FIG. 19.

In this conversion processing, first, a multiplication operation (CMvi×Kc) of multiplying the measured characteristic curve CMvi by the conversion coefficient Kc is performed (step S131 shown in FIG. 18). Then, the preliminary characteristic curve CPvp0 (the preliminary characteristic curve between the predicted value of the voltage value Vp and the ambient temperature Ta) described above is generated (step S132) by performing a subtraction operation on the result of the multiplication operation in the step S131 so that the voltage value Vp=0 is achieved at the predetermined reference temperature Tr (Tr=40° C. in the example shown in FIG. 19). In other words, due to such preliminary processing (the processing in the steps S131, S132), such a preliminary characteristic curve CPvp0 as shown in, for example, FIG. 19 is generated as a result from the measured characteristic curve CMvi using the conversion coefficient Kc. It should be noted that the execution sequence of the processing in the steps S131, S132 when executing such preliminary processing can be, for example, an opposite execution sequence (a sequence in which the step S132 is executed first, and then the step S131 is executed) to that in the example shown in FIG. 18.

Subsequently, an add operation (CPvp0+ΔVp) of adding a predetermined voltage shift amount ΔVp to the voltage value Vp in the preliminary characteristic curve CPvp0 is performed so as to achieve the voltage value Vp in (the DV standard or the Vj standard) described above with reference to FIG. 17 to generate (step S133) the determinative predictive characteristic curve CPvp. In other words, such a voltage value Vp (the voltage value Vp in the predictive characteristic curve CPvp) after adding the voltage shift amount ΔVp corresponds to the voltage value Vp with which the standard drop volume of the ink 9 can be obtained, or the voltage value Vp with which the standard ejection speed can be obtained, when the ink 9 is jetted. In such a manner, the determinative predictive characteristic curve CPvp is generated, and the sequence of conversion processing shown in FIG. 18 is terminated.

Incidentally, the specific conversion equation when performing such conversion processing is expressed as the following formula (1) using the conversion coefficient Kc described above.

$$H=(H_0\times e^{(E/kT)})/Kc \quad (1)$$

H: a value obtained by performing the conversion processing on the viscosity value of the ink 9

$H_0$: a constant

T: absolute temperature (the ambient temperature Ta)

E: activation energy k: Boltzmann constant

It should be noted that the formula obtained by removing the conversion coefficient Kc from the formula (1) described above is called Arrhenius equation (law), and is well known to the public. Further, the reason that the Arrhenius equation is divided by the conversion coefficient Kc in the formula (1) is that the calculation using (the viscosity value of the ink 9)/(the measured value of the voltage value Vp) is performed when performing the analytical method using the machine learning model 74A. Therefore, for example, when performing the calculation using (the measured value of the voltage value Vp)/(the viscosity value of the ink 9), conversely, when performing the analytical method using the machine learning model 74A, a formula of multiplying the Arrhenius equation described above by the conversion coefficient Kc becomes the conversion equation when performing the conversion processing described above. In other words, it can be said that either of these can be used as the conversion equation when performing the conversion processing.

(Regarding Input Parameters Prin)

Here, as specific examples of the input parameters Prin described above in Modified Example 1, there can be cited those listed below in (a) through (k), and (l) described in the embodiment as shown in FIG. 20.

(a) the number of drops (the number of pulses)
(b) presence or absence of the common drive
(c) the head type
(d) the ink type
(e) (the DV standard or the Vj standard)
(f) the head rank value
(g) the viscosity value at the reference temperature Tr
(l) the voltage sensitivity Vr when performing ejection
(h) the surface tension value of the ink 9
(i) the specific gravity value of the ink 9
(k) the voltage shift amount ΔVp
(j) the target value of DV or Vj (Regarding Details of Processing of Generating Characteristic Table, Etc.)

Figure 21:
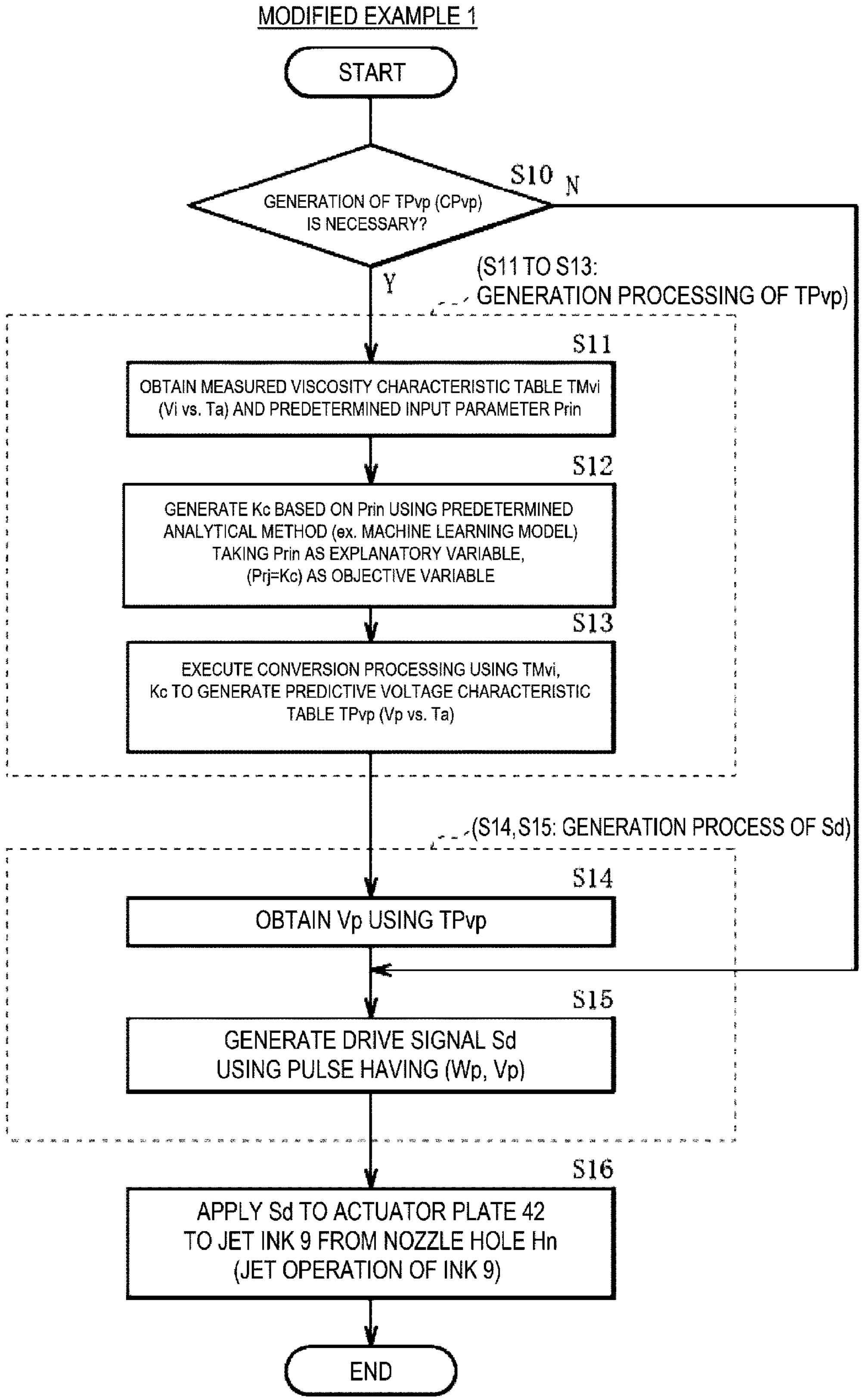
FIG. 21 is a flowchart showing characteristic table generation processing and so on related to Modified Example 1.

Here, FIG. 21 is a flowchart showing processing of generating the characteristic table (the predictive voltage characteristic table TPvp) and so on related to Modified Example 1. It should be noted that out of a series of processing (steps S10 through S16 described later) shown in FIG. 21, the processing in the steps S11 through S13 described later corresponds to the processing of generating the predictive voltage characteristic table TPvp, and the processing in the steps S14, S15 described later corresponds to the processing of generating the drive signal Sd.

In the series of processing shown in FIG. 21, the information processor 73 (the program 730) first makes (step S10) a judgment on whether or not it is necessary to generate (update) the predictive voltage characteristic table TPvp which defines the predictive characteristic curve CPvp described above as a preliminary step. Here, when it has been judged that it is necessary to generate the predictive voltage characteristic table TPvp (Y in the step S10), there is made the transition to the processing of generating the predictive voltage characteristic table TPvp (steps S11 through S13) described hereinafter. In contrast, when it has been judged that it is unnecessary to generate the predictive voltage characteristic table TPvp (N in the step S10), the transition to the step S15 described later is made, and the operation of generating the drive signal Sd is performed as a result using the pulse having the voltage value Vp (the crest value) in the present stage.

It should be noted that as an example of the case in which it is necessary to generate the predictive voltage characteristic table TPvp, there can be cited, for example, the following cases. That is, there can be cited, for example, when a predetermined time has elapsed, when the cartridge of the ink tank 3 is mounted, when a predetermined operation signal from the user has been input to the printer 1, and when a non-ejection period (an idle period) of the ink 9 has become longer than a predetermined time. Further, there can also be cited, for example, when the color, the type, or the like of the ink 9 in the ink tank 3 has been changed, and when the inkjet head 4 of a different model has been installed in the printer 1. Further, there can also be cited, for example, when at least one of input parameters Prin as shown in FIG. 20 has been changed.

(Steps S11 Through S13: Processing of Generating Predictive Voltage Characteristic Table TPvp)

Subsequently, in the processing of generating the predictive voltage characteristic table TPvp (steps S11 through S13), first, the data acquisition section 731 obtains the following data (the input data). Specifically, the data acquisition section 731 obtains (step S11) each of the measured viscosity characteristic table TMvi defining the measured characteristic curve CMvi between the viscosity Vi of the ink 9 and the ambient temperature Ta, and the predetermined input parameters Prin described above as the input data using the method described above.

Then, the parameter generation section 732 generates (step S12) the conversion coefficient Kc based on the input parameters Prin using the predetermined analytical method which takes the input parameters Prin obtained in the step S11 as the explanatory variables, and takes the conversion coefficient Kc as the jet parameter Prj as the objective variable. Specifically, in Modified Example 1, the parameter generation section 732 generates the conversion coefficient Kc based on the input parameters Prin utilizing the analytical method using the machine learning model 74A described above.

Then, the table generation section 733 performs the predetermined conversion processing (see FIG. 18, FIG. 19) described above using the measured viscosity characteristic table TMvi obtained in the step S11 and the conversion coefficient Kc generated in the step S12 to thereby generate (step S13) the predictive voltage characteristic table TPvp. In such a manner, as described above, there is generated the predictive voltage characteristic table TPvp which defines the predictive characteristic curve CPvp between the voltage value Vp (the crest value) of the pulse of the drive signal Sd and the ambient temperature Ta.

(Steps S14, S15: Processing of Generating Drive Signal Sd)

Subsequently, in the processing of generating the drive signal Sd (steps S14, S15), first, the signal generation section 48 obtains (step S14) the voltage value Vp (the crest value) in the pulse of the drive signal Sd with the method (see FIG. 6A through FIG. 6C) described above using the predictive voltage characteristic table TPvp generated in the step S13. Specifically, it is configured that the voltage value Vp of the pulse can be obtained by applying the current ambient temperature Ta to the predictive voltage characteristic table TPvp.

Then, the signal generation section 48 generates (step S15) such a drive signal Sd as shown in, for example, FIG. 6A through FIG. 6C described above using the pulse having the voltage value Vp obtained in the step S14 and, for example, the pulse width Wp set in advance.

Incidentally, it is configured that the pulse width Wp described above can be obtained based on, for example, an on-pulse peak (AP) in the pulse. The AP corresponds to a period (1 AP=(characteristic vibration period of the ink 9)/2) half as large as the characteristic vibration period of the ink 9 in the ejection channel described above. Further, when the pulse width Wp is set to the AP, the jetting speed (the ejection efficiency) of the ink 9 is maximized when ejecting (making one droplet ejection of) the ink 9 as much as one normal droplet. Further, the AP is configured to be defined by, for example, the shape of the ejection channel and a physical property value (the specific gravity or the like) of the ink 9.

Further, it is configured that the pulse width Wp is set in, for example, the following manner based on such an AP. That is, in the case of the examples of the drive signal Sd shown in, for example, FIG. 6A through FIG. 6C described above (the examples of the cases of so-called "one drop," "two drops," and "three drops," respectively), the signal generation section 48 sets the pulse widths Wp in the following manner. That is, in the examples of FIG. 6A through FIG. 6C, the signal generation section 48 sets the pulse widths Wp so that, for example, the pulse widths Wp described above fulfill the relationships represented by the formula (2) and the formula (3) described below with the AP. It should be noted that the examples represented by the formula (2) and the formula (3) are not a limitation, and it is possible to arbitrarily set the pulse widths Wp.

$$(1.25\times AP)\leq(Wpa1,\ Wpa2,\ Wpa3,\ Wpb2,\ Wpb3,\ Wpc3)\leq(1.75\times AP) \quad (2)$$

$$(Wpa1)\geq(Wpa2,\ Wpb2)\geq(Wpa3,\ Wpb3,\ Wpc3) \quad (3)$$

(Step S16: Jet Operation of Ink 9)

Subsequently, the driver 49 applies the drive signal Sd generated in the step S15 to the actuator plate 42 described above in the inkjet head 4 to jet (step S16) the ink 9 from the nozzle holes Hn. In such a manner, the jet operation of the ink 9 described above is performed.

This terminates the series of processing shown in FIG. 21.

In such a manner, in the method of Modified Example 1, the conversion coefficient Kc is generated based on the predetermined input parameters Prin by using the predetermined analytical method, and the predictive voltage characteristic table TPvp is generated by performing the conversion processing using the measured viscosity characteristic table TMvi and the conversion coefficient Kc. That is, the predictive voltage characteristic table TPvp which defines the predictive characteristic curve CPvp between the voltage value Vp (the crest value) and the ambient temperature Ta is automatically generated in each case.

Thus, in Modified Example 1, the work burden and the operating cost are reduced compared to when obtaining the characteristic curve (the measured characteristic curve CMvp described above) between these voltage values Vp and the ambient temperature Ta by performing the actual measurement (e.g., when obtaining the characteristic curve by performing the actual measurement for each of the types of the number of pulses included in the drive signal Sd) as in, for example, Comparative Example 2described above. Further, the characteristic curve (the measured characteristic curve CMvp) between the voltage value Vp described above and the ambient temperature Ta generally becomes a curve different in gradient and so on in accordance with the type of the number of pulses included in the drive signal Sd, the class and the role of each of the pulses, and so on as described above, and therefore, the predictive voltage characteristic table TPvp is automatically generated in each case, and thus, the following results. That is, it is possible to accurately set the voltage value Vp (the crest value) of the pulse in the drive signal Sd compared to when, for example, using a single characteristic curve in two or more cases.

Due to the facts described above, in Modified Example 1, it is possible to increase the efficiency of the work for obtaining the characteristic curve (the voltage characteristic table) between the voltage value Vp described above and the ambient temperature Ta, and at the same time, it is possible to easily improve the setting accuracy of the voltage value Vp (the crest value) of the pulse in the drive signal Sd.

Further, in Modified Example 1, for example, it becomes possible to obtain such advantages as described below.

- Since the characteristic curve between the voltage value Vp described above and the ambient temperature Ta can easily be obtained, the voltage control of making the ejection speed and the drop volume of the ink 9 substantially constant becomes easy even when, for example, the type of the number of pulses described above, the class and the role of each of the pulses, and so on are different.
- Since expensive evaluation equipment (a temperature controller and so on) used when obtaining the measured characteristic curve CMvp in such a manner as in Comparative Example 2 described above becomes unnecessary, it becomes possible to reduce the cost.

C. Comparative Example 3

It should be noted that also in Modified Example 1, such a case as described above can occur depending on the condition as described above in the embodiment. In other words, there is a case in which the prediction accuracy of the jet parameters Prj in, for example, the DV standard or the Vj standard degrades when using the predetermined analytical method in the condition in which both of the DV standard and the Vj standard are mixed with each other (Comparative Example 3) similarly to the case of Comparative Example 1 described above. Such Comparative Example 3 will hereinafter be described.

Figure 22:
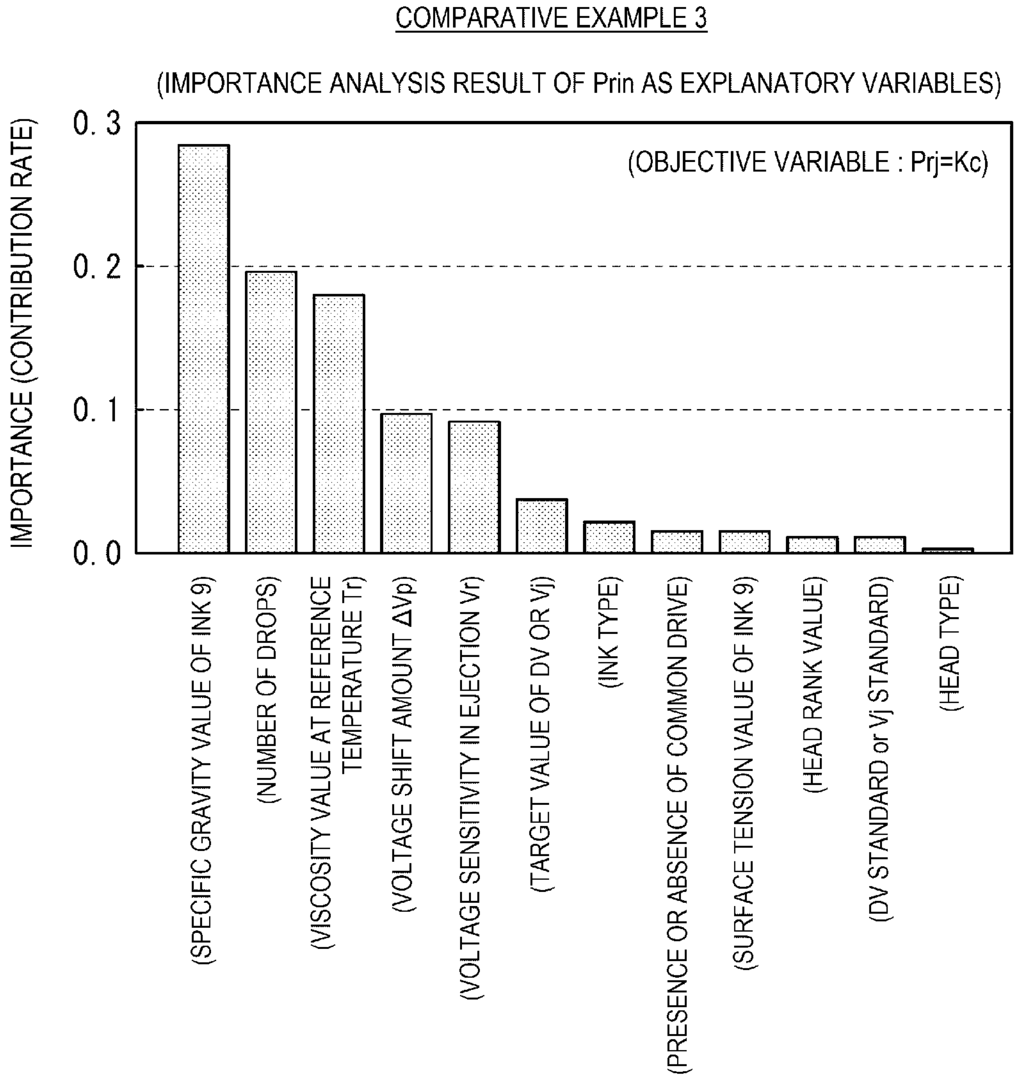
FIG. 22 is a diagram showing an example of an importance analysis result of input parameters related to Comparative Example 3.

FIG. 22 is a diagram showing an example of an importance analysis result of the input parameters Prin related to Comparative Example 3. In the example shown in FIG. 22, the input parameters Prin which are made relatively high in importance (contribution rate) when generating the jet parameter Prj (=the conversion coefficient Kc) using the machine learning model 74A are as follows. In other words, in the input parameters Prin listed in (a) through (k), and (l) described above, the importance is made higher in the order of (i) the specific gravity value of the ink 9, (a) the number of drops, (g) the viscosity value at the reference temperature Tr, (k) the voltage shift amount ΔVp, (l) the voltage sensitivity Vr when performing ejection, and (j) the target value of DV or Vj.

Therefore, in Comparative Example 3, the predetermined analytical method is used in the condition in which both of the DV standard and the Vj standard are mixed with each other selectively using, for example, these parameters as the input parameter Prin. Then, as described above, the prediction accuracy of the jet parameter Prj in, for example, the DV standard or the Vj standard degrades in some cases also in Comparative Example 3 similarly to the case of Comparative Example 1. As a result, there is a possibility that the convenience of the user degrades also in Comparative Example 3 similarly to the case of Comparative Example 1.

D. Processing of Generating Jet Parameters Prj in Modified Example 1

Therefore, which one of the DV standard and the Vj standard is to be selected is determined based on the selection instruction signal Ss described above when generating the conversion coefficient Kc as the jet parameter Prj also in Modified Example 1 similarly to the embodiment described above. Further, by using the predetermined analytical method using just one of the first explanatory variable group Print and the second explanatory variable group Prin2 selected in accordance with such a determination result of the standard, the conversion coefficient Kc as the jet parameter Prj is generated.

Figure 23A:
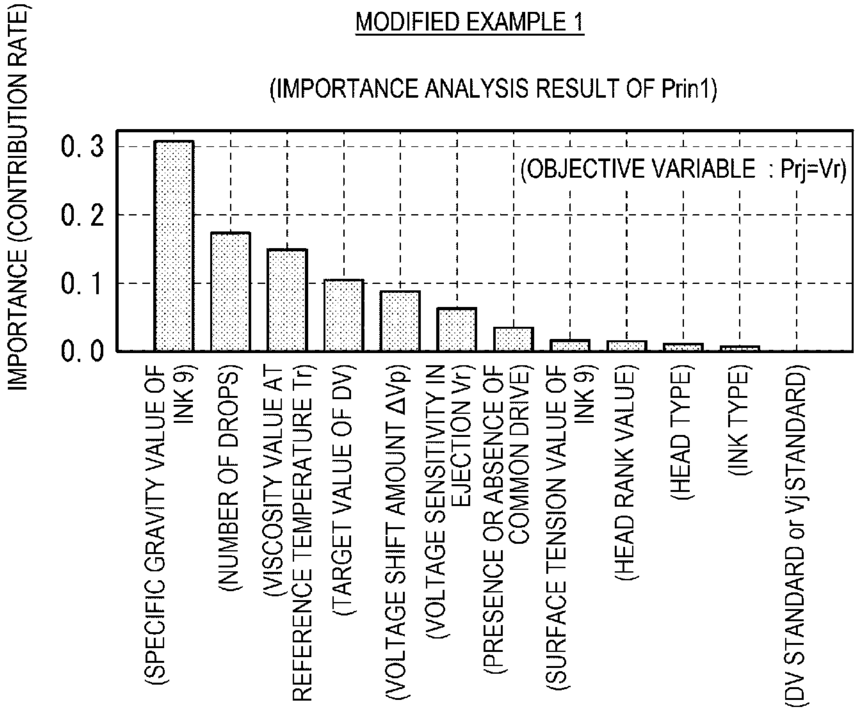
FIG. 23A is a diagram showing an example of an importance analysis result of a first explanatory variable group related to Modified Example 1.

Here, FIG. 23A is a diagram showing an example of the importance analysis result in the first explanatory variable group Print related to Modified Example 1. Further, FIG. 23B is a diagram showing an example of the importance analysis result in the second explanatory variable group Prin2 related to Modified Example 1.

As shown in FIG. 23A, as the first explanatory variable group Print related to Modified Example 1, there is included, for example, at least one of the following parameters out of the input parameters Prin described above. Specifically, in the example shown in FIG. 23A, there are included (i) the specific gravity value of the ink 9, (a) the number of drops, (g) the viscosity value at the reference temperature Tr, (j) the target value of DV, (k) the voltage shift amount ΔVp, (l) the voltage sensitivity Vr when performing ejection, (b) presence or absence of the common drive, (h) the surface tension value of the ink 9, (f) the head rank value, (c) the head type, and (d) the ink type. Further, as shown in FIG. 23A, the importance (the degree of contribution) becomes relatively higher in this order.

Figure 23B:
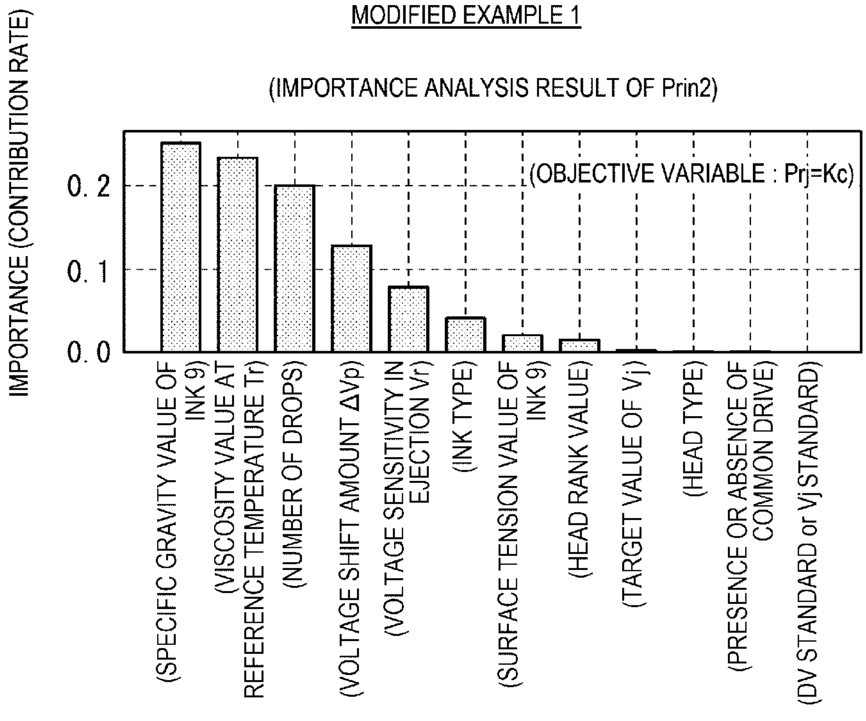
FIG. 23B is a diagram showing an example of an importance analysis result of a second explanatory variable group related to Modified Example 1.

In contrast, as shown in FIG. 23B, as the second explanatory variable group Prin2 related to Modified Example 1, there is included, for example, at least one of the following parameters out of the input parameters Prin described above. Specifically, in the example shown in FIG. 23B, there are included (i) the specific gravity value of the ink 9, (g) the viscosity value at the reference temperature Tr, (a) the number of drops, (k) the voltage shift amount ΔVp, (l) the voltage sensitivity Vr when performing ejection, (d) the ink type, (h) the surface tension value of the ink 9, (f) the head rank value, (j) the target value of Vj, (c) the head type, and (b) presence or absence of the common drive. Further, as shown in FIG. 23B, the importance (the degree of contribution) becomes relatively higher in this order.

Figure 24A:
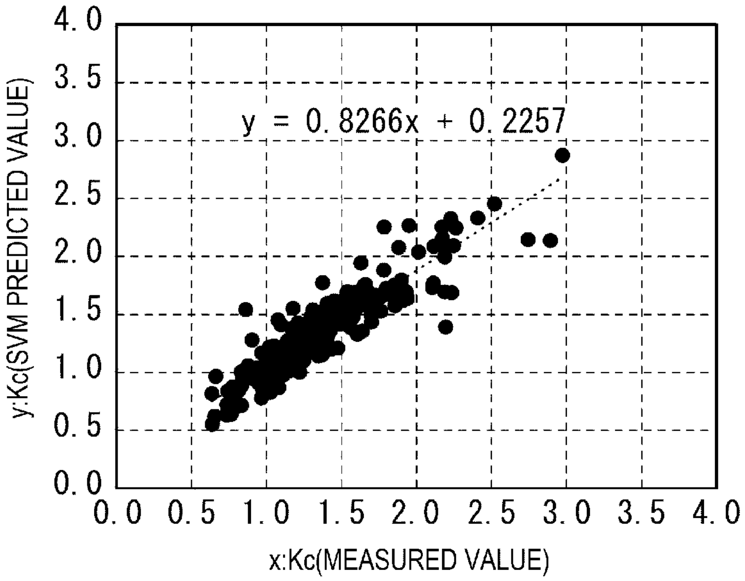
FIG. 24A is a diagram showing an example of a correspondence relationship between the SVM predicted value and the measured value when using only the first explanatory variable group shown in FIG. 23A.
Figure 24B:
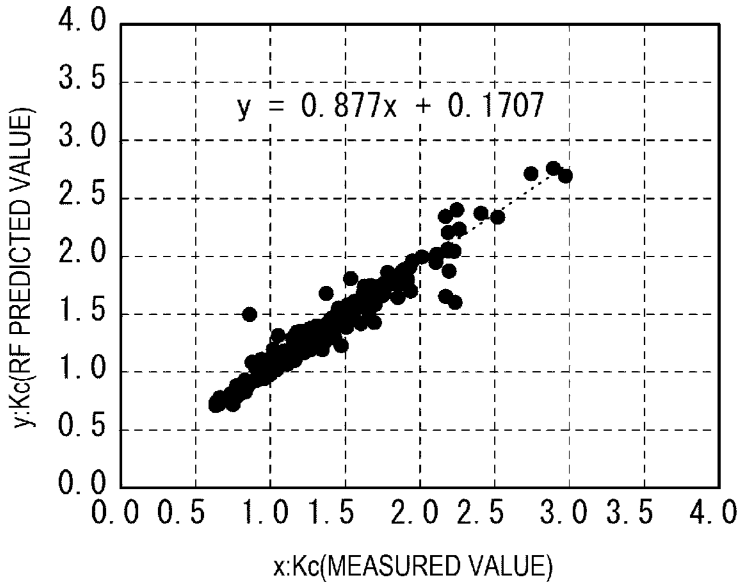
FIG. 24B is a diagram showing an example of a correspondence relationship between the RF predicted value and the measured value when using only the first explanatory variable group shown in FIG. 23A.
Figure 25A:
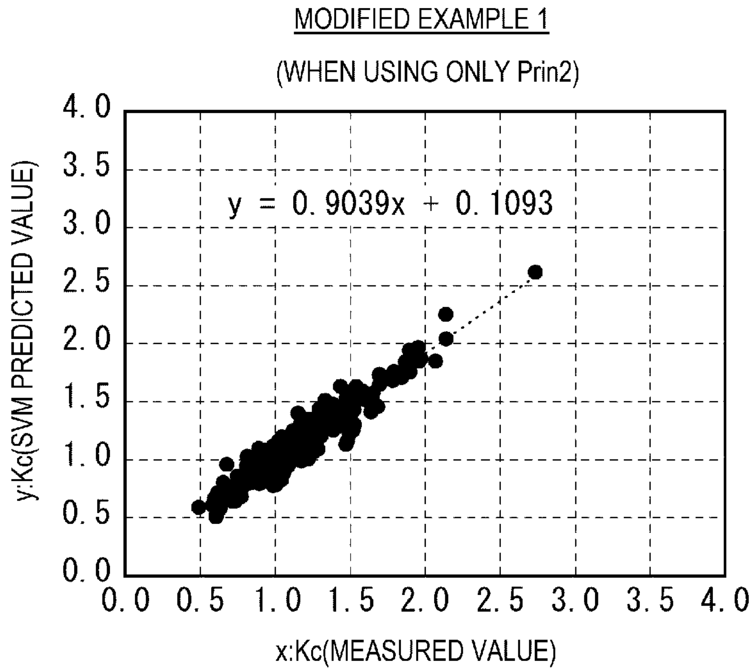
FIG. 25A is a diagram showing an example of a correspondence relationship between the SVM predicted value and the measured value when using only the second explanatory variable group shown in FIG. 23B.
Figure 25B:
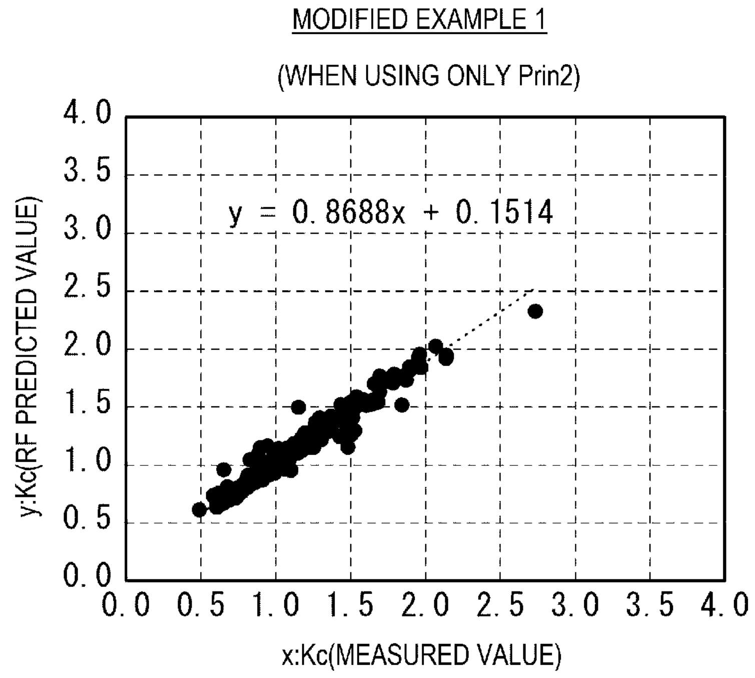
FIG. 25B is a diagram showing an example of a correspondence relationship between the RF predicted value and the measured value when using only the second explanatory variable group shown in FIG. 23B.

Here, FIG. 24A and FIG. 24B are each a diagram showing an example of a correspondence relationship between the predicted value (the SVM predicted value, the RF predicted value) and the measured value when using only the first explanatory variable group Print shown in FIG. 23A. Further, FIG. 25A and FIG. 25B are each a diagram showing an example of a correspondence relationship between the predicted value (the SVM predicted value, the RF predicted value) and the measured value when using only the second explanatory variable group Prin2 shown in FIG. 23B.

It should be noted that the details of these drawings, namely FIG. 24A, FIG. 24B, FIG. 25A, and FIG. 25B, are substantially the same as the case of FIG. 12A, FIG. 12B, FIG. 13A, and FIG. 13B described above. Specifically, in each of the examples shown in FIG. 24A, FIG. 24B, FIG. 25A, and FIG. 25B, the (x,y) coordinate in each of a number of (562) samples is plotted when defining the measured value of the conversion coefficient Kc as the variable x, and defining the predicted value (the SVM predicted value or the RF predicted value) of the conversion coefficient Kc as the variable y. Further, in FIG. 24A, FIG. 24B, FIG. 25A, and FIG. 25B described above, an example of a formula (e.g., a linear function formula identified using the least-square method) representing the tendency of the correlative relationship between these variables x, y is also shown.

In each of the examples shown in FIG. 24A, FIG. 24B, FIG. 25A, and FIG. 25B described above, the gradient in the formula of the linear function described above is made nearly "1," and at the same time, the intercept in the formula of this linear function is made nearly "0" similarly to the case (FIG. 12A, FIG. 12B, FIG. 13A, and FIG. 13B) of the embodiment. Therefore, also in Modified Example 1, unlike Comparative Example 3 described above, regarding the conversion coefficient Kc as the objective variable, the predicted values (the SVM predicted value and the RF predicted value) and the measured value are in the following relationship. That is, it is understood that the predicted value and the measured value have a sufficient correlative relationship to the extent that the predicted value is practicable when performing printing using the predicted value.

E. Functions/Advantages

In such a manner, also in Modified Example 1, it is also possible to obtain basically the same advantages due to substantially the same function as that of the embodiment.

Further, in particular, in Modified Example 1, since the conversion coefficient Kc when performing the predetermined conversion processing described above is at least included as the jet parameter Prj, the following is achieved. In other words, it is possible to increase the prediction accuracy of the conversion coefficient Kc compared to the case of Comparative Example 3 described above when generating the conversion coefficient Kc using the predetermined analytical method described above. As a result, also in Modified Example 1, it becomes possible to further enhance the convenience of the user.

Modified Example 2

In the embodiment described above, there is described when the voltage sensitivity Vr is at least included as the predetermined jet parameter Prj, and in Modified Example 1 described above, there is described when the conversion coefficient Kc is at least included as the predetermined jet parameter Prj. In contrast, in Modified Example 2 described below, there is described an example of the case including at least the voltage shift amount ΔVp described above as the predetermined jet parameters Prj. In other words, the voltage shift amount ΔVp corresponds to a specific example of the "predetermined jet parameter" in the present disclosure.

(A. Configuration)

Figure 26:
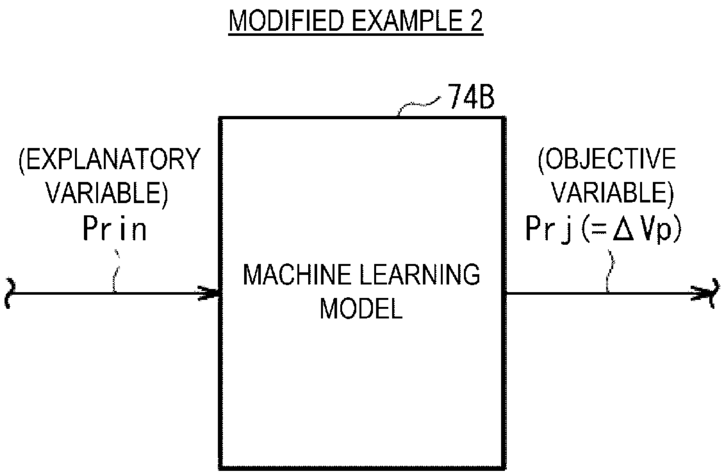
FIG. 26 is a block diagram showing a configuration example of a machine learning model related to Modified Example 2.

FIG. 26 is a block diagram showing a configuration example of a machine learning model (a machine learning model 74B) related to Modified Example 2. The machine learning model 74B is a predictive model obtained by performing the machine learning taking the input parameters Prin as the explanatory variables and taking the jet parameter Prj as the objective variable similarly to the machine learning models 74, 74A having already been described. Further, as shown in FIG. 26, the machine learning model 74B is configured to generate (predict) the jet parameter Prj (the objective variable) based on a learning result, and then output the jet parameter Prj thus generated when the input parameters Prin (the explanatory variables) are input. Then, as described above, the machine learning model 74B generates the predetermined jet parameter Prj so as to include at least the voltage shift amount ΔVp described above as an example (see FIG. 26).

Such a machine learning model 74B is configured to be used in the parameter generation section 732 similarly to the embodiment and Modified Example 1. Specifically, the parameter generation section 732 in Modified Example 2 is configured to generate the jet parameter Prj (the voltage shift amount ΔVp or the like) based on the input parameters Prin using the analytical method using the machine learning model 74B. It should be noted that a specific example of the analytical method (a prediction method) using such a machine learning model 74B is substantially the same as that cited in the embodiment.

(B. Regarding Input Parameters Prin)

FIG. 27 is a diagram showing an example of the input parameters Prin related to Modified Example 2. It should be noted that in FIG. 27, the values of the input parameters Prin are shown with respect to six samples ("sample 1" through "sample 6").

As specific examples of the input parameters Prin in Modified Example 2, there can be cited those listed in (a) through (j), and (l) below described in the embodiment and Modified Example 1 as shown in FIG. 27.

(a) the number of drops (the number of pulses)
(b) presence or absence of the common drive
(c) the head type
(d) the ink type
(e) (the DV standard or the Vj standard)
(f) the head rank value
(g) the viscosity value at the reference temperature Tr
(l) the voltage sensitivity Vr (the DV standard or the Vj standard) when performing ejection
(h) the surface tension value of the ink 9
(i) the specific gravity value of the ink 9
(j) the target value of DV or Vj

C. Comparative Example 4

Here, also in Modified Example 2, such a case as described above can occur depending on the condition as described above in the embodiment and Modified Example 1. In other words, there is a case in which the prediction accuracy of the jet parameters Prj in, for example, the DV standard or the Vj standard degrades when using the predetermined analytical method in the condition in which both of the DV standard and the Vj standard are mixed with each other (Comparative Example 4) similarly to the case of Comparative Example 1 and Comparative Example 3 described above. Such Comparative Example 4 will hereinafter be described.

Figure 28:
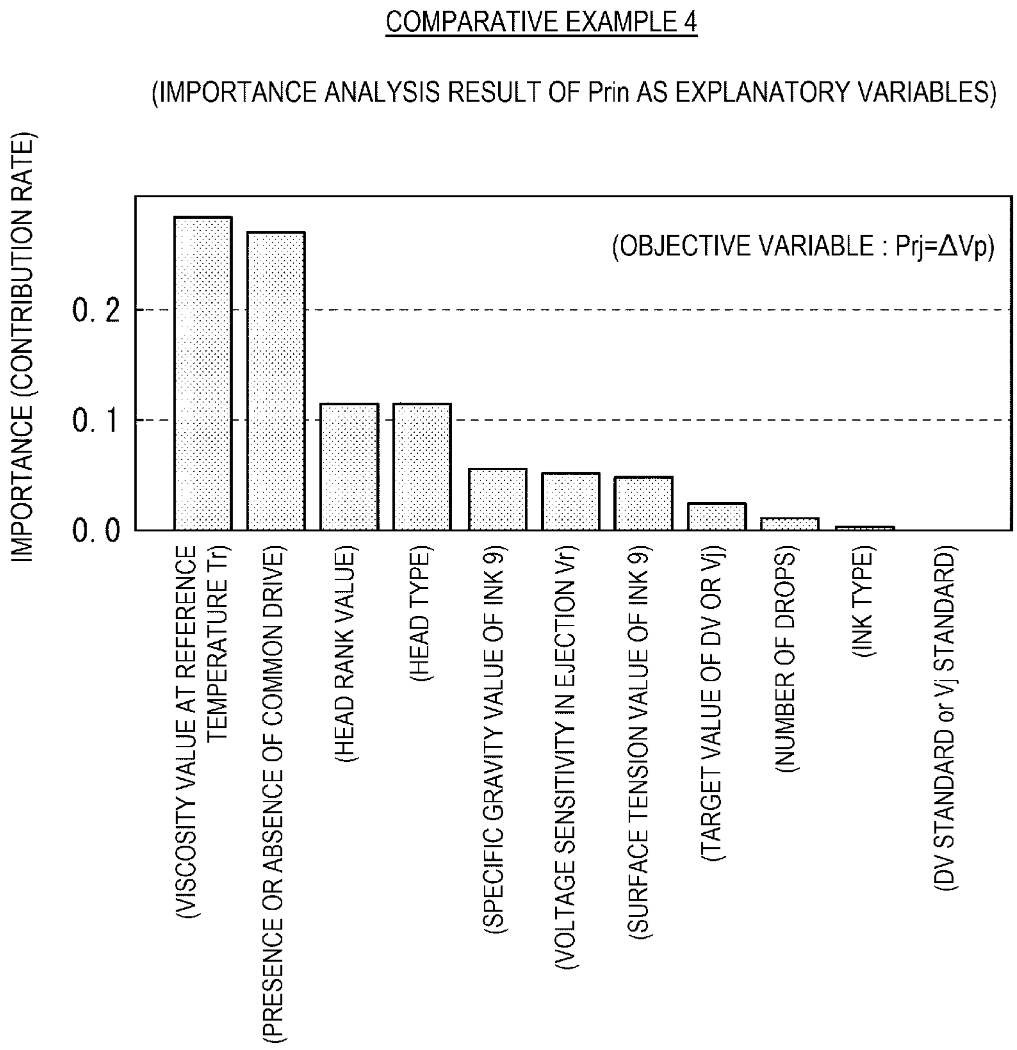
FIG. 28 is a diagram showing an example of an importance analysis result of input parameters related to Comparative Example 4.

FIG. 28 is a diagram showing an example of an importance analysis result of the input parameters Prin related to Comparative Example 4. In the example shown in FIG. 28, the input parameters Prin which are made relatively high in importance (contribution rate) when generating the jet parameter Prj (=the voltage shift amount ΔVp) using the machine learning model 74B are as follows. In other words, in the input parameters Prin listed in (a) through (j), and (l) described above, the importance is made higher in the order of (g) the viscosity value at the reference temperature Tr, (b) presence or absence of the common drive, (f) the head rank value, (c) the head type, (i) the specific gravity value of the ink 9, (l) the voltage sensitivity Vr when performing ejection, (h) the surface tension value of the ink 9, and (j) the target value of DV or Vj.

Therefore, in Comparative Example 4, the predetermined analytical method is used in the condition in which both of the DV standard and the Vj standard are mixed with each other selectively using, for example, these parameters as the input parameter Prin. Then, as described above, the prediction accuracy of the jet parameter Prj in, for example, the DV standard or the Vj standard degrades in some cases also in Comparative Example 4 similarly to the case of Comparative Example 1 and Comparative Example 3. As a result, there is a possibility that the convenience of the user degrades also in Comparative Example 4 similarly to the case of Comparative Example 1 and Comparative Example 3.

D. Processing of Generating Jet Parameter Prj in Modified Example 2

Therefore, which one of the DV standard and the Vj standard is to be selected is determined based on the selection instruction signal Ss described above when generating the voltage shift amount ΔVp as the jet parameter Prj also in Modified Example 2 similarly to the embodiment and Modified Example 1 described above. Further, by using the predetermined analytical method using just one of the first explanatory variable group Print and the second explanatory variable group Prin2 selected in accordance with such a determination result of the standard, the voltage shift amount ΔVp as the jet parameter Prj is generated.

Figure 29A:
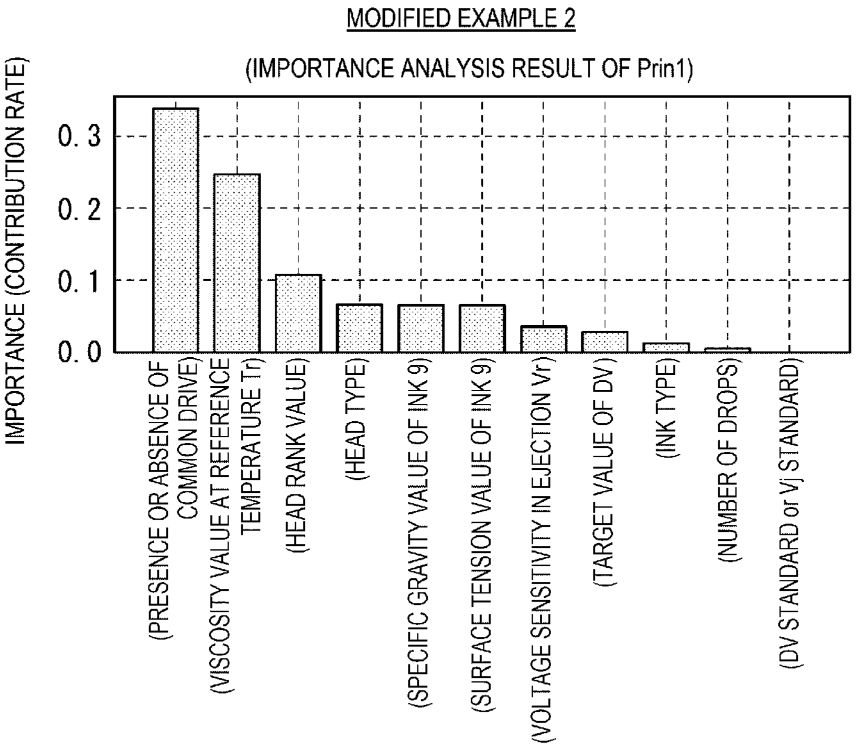
FIG. 29A is a diagram showing an example of an importance analysis result of a first explanatory variable group related to Modified Example 2.

Here, FIG. 29A is a diagram showing an example of the importance analysis result in the first explanatory variable group Print related to Modified Example 2. Further, FIG. 29B is a diagram showing an example of the importance analysis result in the second explanatory variable group Prin2 related to Modified Example 2.

As shown in FIG. 29A, as the first explanatory variable group Print related to Modified Example 2, there is included, for example, at least one of the following parameters out of the input parameters Prin described above. Specifically, in the example shown in FIG. 29A, there are included (b) presence or absence of the common drive, (g) the viscosity value at the reference temperature Tr, (f) the head rank value, (c) the head type, (i) the specific gravity value of the ink 9, (h) the surface tension value of the ink 9, (l) the voltage sensitivity Vr when performing ejection, (j) the target value of DV, (d) the ink type, and (a) the number of drops. Further, as shown in FIG. 29A, the importance (the degree of contribution) becomes relatively higher in this order.

Figure 29B:
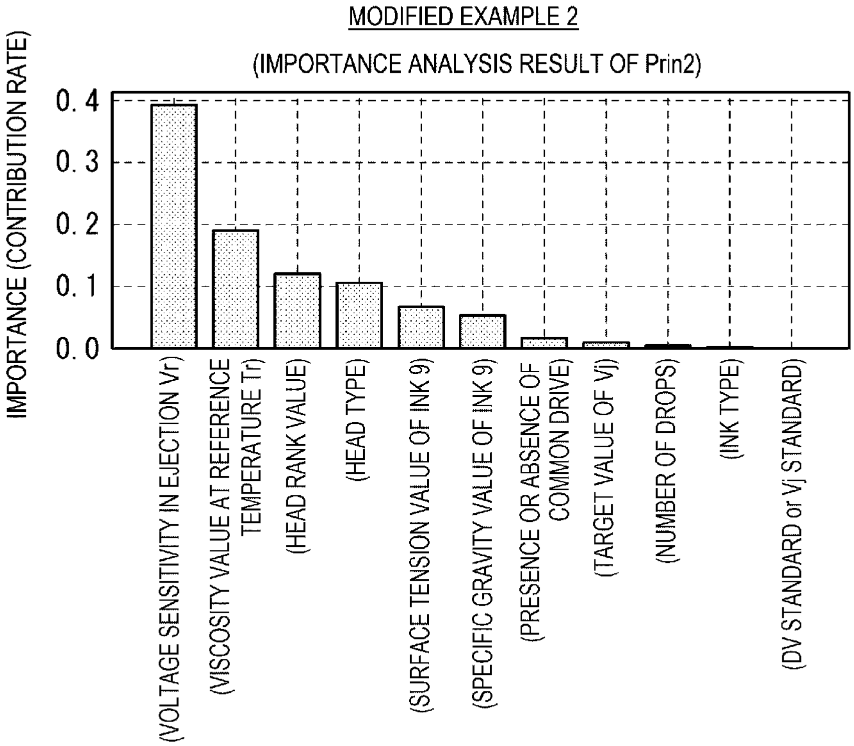
FIG. 29B is a diagram showing an example of an importance analysis result of a second explanatory variable group related to Modified Example 2.

In contrast, as shown in FIG. 29B, as the second explanatory variable group Prin2 related to Modified Example 2, there is included, for example, at least one of the following parameters out of the input parameters Prin described above. Specifically, in the example shown in FIG. 29B, there are included (l) the voltage sensitivity Vr when performing ejection, (g) the viscosity value at the reference temperature Tr, (f) the head rank value, (c) the head type, (h) the surface tension value of the ink 9, (i) the specific gravity value of the ink 9, (b) presence or absence of the common drive, (j) the target value of Vj, (a) the number of drops, and (d) the ink type. Further, as shown in FIG. 29B, the importance (the degree of contribution) becomes relatively higher in this order.

Figure 30A:
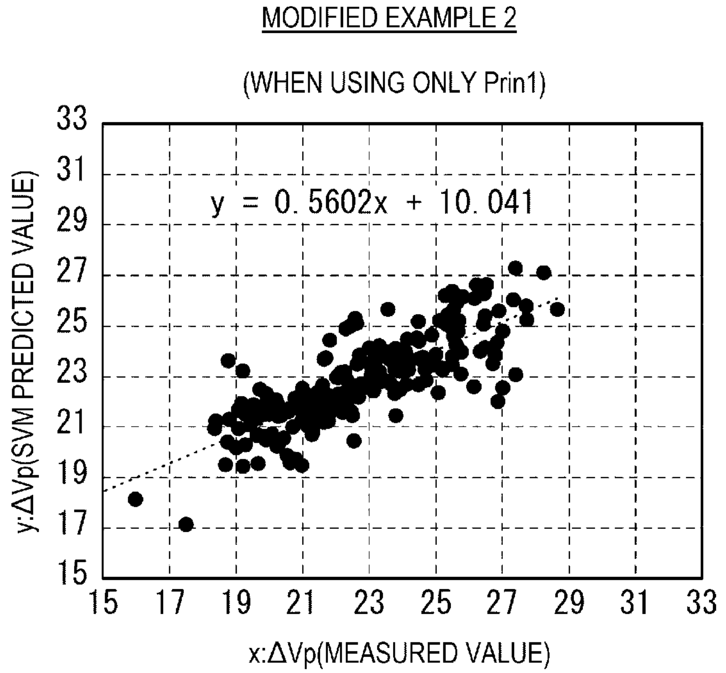
FIG. 30A is a diagram showing an example of a correspondence relationship between the SVM predicted value and the measured value when using only the first explanatory variable group shown in FIG. 29A.
Figure 30B:
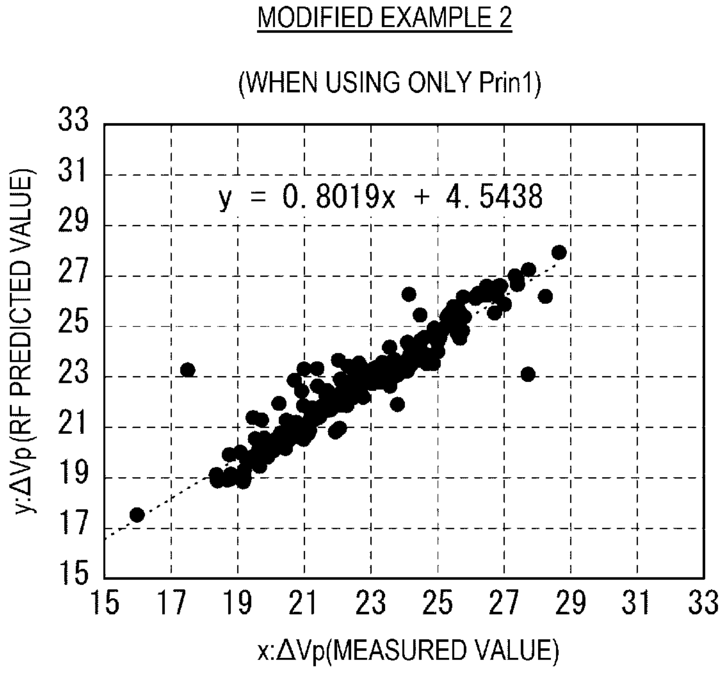
FIG. 30B is a diagram showing an example of a correspondence relationship between the RF predicted value and the measured value when using only the first explanatory variable group shown in FIG. 29A.
Figure 31A:
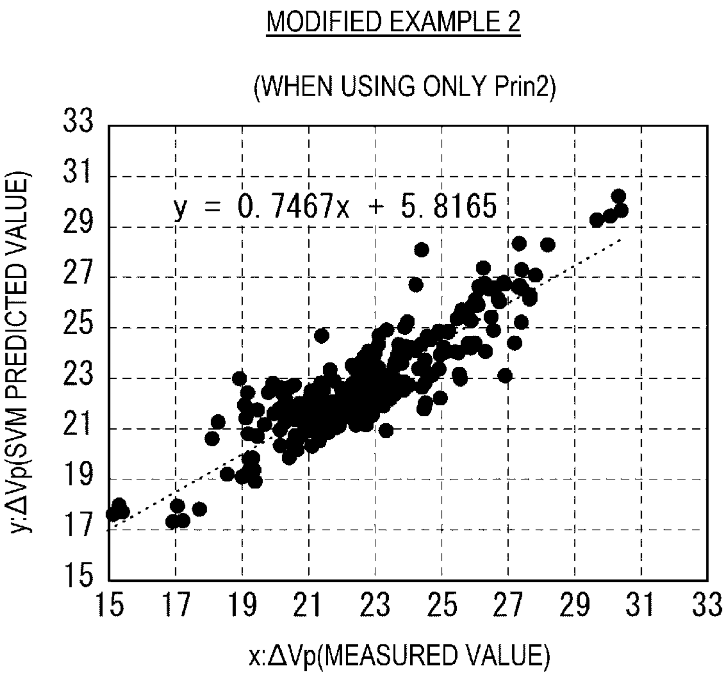
FIG. 31A is a diagram showing an example of a correspondence relationship between the SVM predicted value and the measured value when using only the second explanatory variable group shown in FIG. 29B.
Figure 31B:
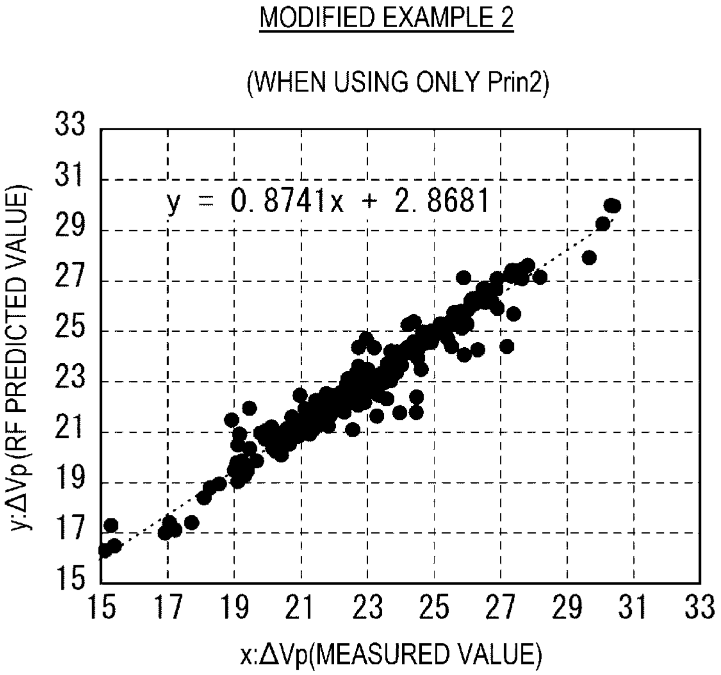
FIG. 31B is a diagram showing an example of a correspondence relationship between the RF predicted value and the measured value when using only the second explanatory variable group shown in FIG. 29B.

Here, FIG. 30A and FIG. 30B are each a diagram showing an example of a correspondence relationship between the predicted value (the SVM predicted value, the RF predicted value) and the measured value when using only the first explanatory variable group Print shown in FIG. 29A. Further, FIG. 31A and FIG. 31B are each a diagram showing an example of a correspondence relationship between the predicted value (the SVM predicted value, the RF predicted value) and the measured value when using only the second explanatory variable group Prin2 shown in FIG. 29B.

It should be noted that the details of these drawings, namely FIG. 30A, FIG. 30B, FIG. 31A, and FIG. 31B, are substantially the same as the case of FIG. 12A, FIG. 12B, FIG. 13A, FIG. 13B, FIG. 24A, FIG. 24B, FIG. 25A, and FIG. 25B described above. In other words, in the examples shown in FIG. 30A, FIG. 30B, FIG. 31A, and FIG. 31B, when defining the measured value of the voltage shift amount ΔVp as the variable x, and defining the predicted value (the SVM predicted value or the RF predicted value) of the voltage shift amount ΔVp as the variable y, the (x,y) coordinates in a number of (562) samples are plotted. Further, in FIG. 30A, FIG. 30B, FIG. 31A, and FIG. 31B described above, an example of a formula (e.g., a linear function formula identified using the least-square method) representing the tendency of the correlative relationship between these variables x, y is also shown.

In each of the examples shown in FIG. 30A, FIG. 30B, FIG. 31A, and FIG. 31B described above, the following is achieved basically similarly to the case of the embodiment (FIG. 12A, FIG. 12B, FIG. 13A, and FIG. 13B) and the case of Modified Example 1 (FIG. 24A, FIG. 24B, FIG. 25A, and FIG. 25B). Specifically, the gradient in the formula of the linear function described above approximates to "1," and at the same time, the intercept in the formula of the linear function approximates to "0." Therefore, also in Modified Example 2, unlike Comparative Example 4 described above, regarding the voltage shift amount ΔVp as the objective variable, the predicted values (the SVM predicted value and the RF predicted value) and the measured value are in the following relationship. That is, it is understood that the predicted value and the measured value have a sufficient correlative relationship to the extent that the predicted value is practicable when performing printing using the predicted value.

E. Functions/Advantages

In such a manner, also in Modified Example 2, it is also possible to obtain basically the same advantages due to substantially the same function as that of the embodiment.

Further, in particular, in Modified Example 2, since the voltage shift amount ΔVp used when performing the predetermined conversion processing described above is at least included as the jet parameter Prj, the following is achieved. In other words, it is possible to increase the prediction accuracy of the voltage shift amount ΔVp compared to the case of Comparative Example 4 described above when generating the voltage shift amount ΔVp using the predetermined analytical method described above. As a result, also in Modified Example 2, it becomes possible to further enhance the convenience of the user.

Modified Example 3

(Configuration)

Figure 32:
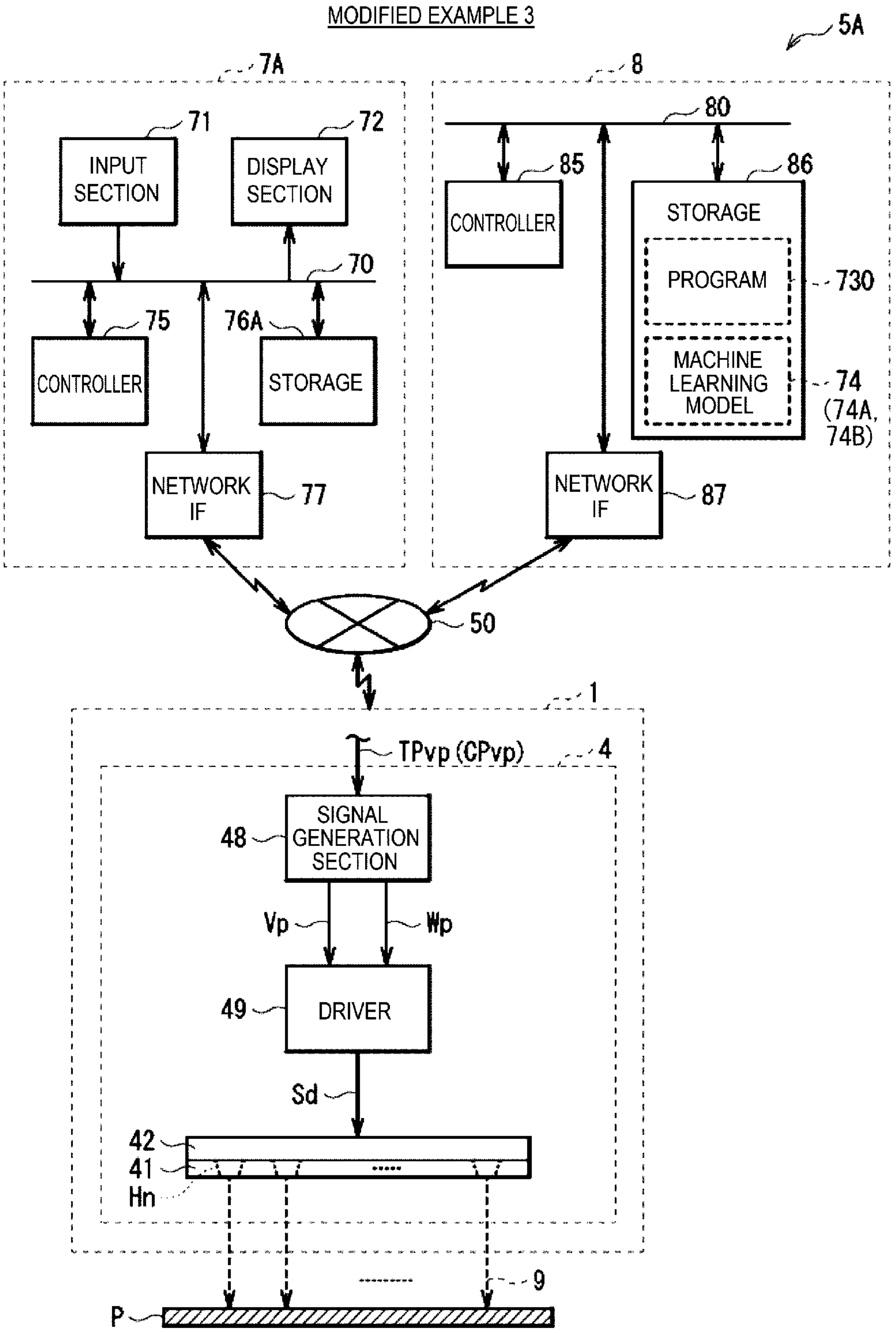
FIG. 32 is a block diagram showing a configuration example of a jet parameter generation system according to Modified Example 3.

FIG. 32 is a block diagram showing a configuration example of a jet parameter generation system 5A according to Modified Example 3. The jet parameter generation system 5A according to Modified Example 3 is provided with the printer 1 having the inkjet heads 4, and an information processing device 7A and a server 8 located outside the printer 1. Further, the printer 1, the information processing device 7A, and the server 8 are connected to each other via the network 50. In other words, the jet parameter generation system 5A corresponds to a system obtained by providing the information processing device 7A instead of the information processing device 7, and at the same time, further providing the server 8 in the jet parameter generation system 5 according to the embodiment.

It should be noted that in Modified Example 3, the server 8 described above corresponds to a specific example of the "external device" in the present disclosure.

As shown in FIG. 32, the information processing device 7A has the bus 70, the input section 71, the display section 72, the controller 75, a storage 76A, and the network IF 77 as a physical block configuration. In other words, the information processing device 7A corresponds to a device obtained by disposing the storage 76A instead of the storage 76 in the information processing device 7 in the embodiment shown in FIG. 4. Unlike the storage 76, the storage 76A does not store the program 730 and the machine learning model 74 described in the embodiment. Therefore, the information processing device 7A is, for example, made to correspond to a PC having a common (general-purpose) configuration.

As shown in FIG. 32, the server 8 has a bus 80, a controller 85, a storage 86, and a network IF 87 as a physical block configuration. It should be noted that the controller 85, the storage 86, and the network IF 87 are connected to each other via the bus 80. The controller 85 and the network IF 87 respectively have substantially the same configurations as those of the controller 75 and the network IF 77 in the embodiment (FIG. 4). Further, the storage 86 also has substantially the same configuration as that of the storage 76 in the embodiment (FIG. 4). In other words, as shown in FIG. 32, the storage 86 stores the program 730 and the machine learning model 74 described in the embodiment. It should be noted that as described with parentheses in FIG. 32, it is possible to arrange that the machine learning models 74A, 74B described in Modified Example 1 and the Modified Example 2 are disposed in addition to such a machine learning model 74, which also applies to Modified Example 4 through Modified Example 6 described later.

In such a manner, in the jet parameter generation system 5A according to Modified Example 3, it is configured that the predetermined jet parameters Prj (and the predictive voltage characteristic table TPvp) described above are generated in the server 8 instead of the information processing device 7A unlike the jet parameter generation system 5 according to the embodiment. Further, the predictive voltage characteristic table TPvp generated in such a manner is configured to be supplied to the signal generation section 48 in the inkjet head 4 in the printer 1 from the server 8 via the network 50 as shown in FIG. 32.

(Functions/Advantages)

Also in Modified Example 3 having such a configuration, it is possible to obtain substantially the same advantages due to substantially the same function as that of the jet parameter generation system 5 according to the embodiment in the elementary sense as a whole of the jet parameter generation system 5A.

Further, in particular in Modified Example 3, since it is configured that the data acquisition section 731, the parameter generation section 732, and the table generation section 733 (the program 730 described above) described above are each disposed outside (in the server 8) the printer 1, the following results. That is, it is possible to perform the automatic generation of the jet parameters Prj and the predictive voltage characteristic table TPvp in the server 8 described above while keeping the existing configuration with respect to the inkjet heads 4 and the printer 1 similarly to the case of the embodiment described above. Further, in Modified Example 3, the existing (general-purpose) configuration can also be used in the information processing device 7A as described above, and it is possible to obtain substantially the same advantages as in the embodiment using the server 8 which functions as, for example, a cloud server. As a result, in Modified Example 3, it becomes possible to further enhance the convenience of the user.

Modified Example 4

(Configuration)

Figure 33:
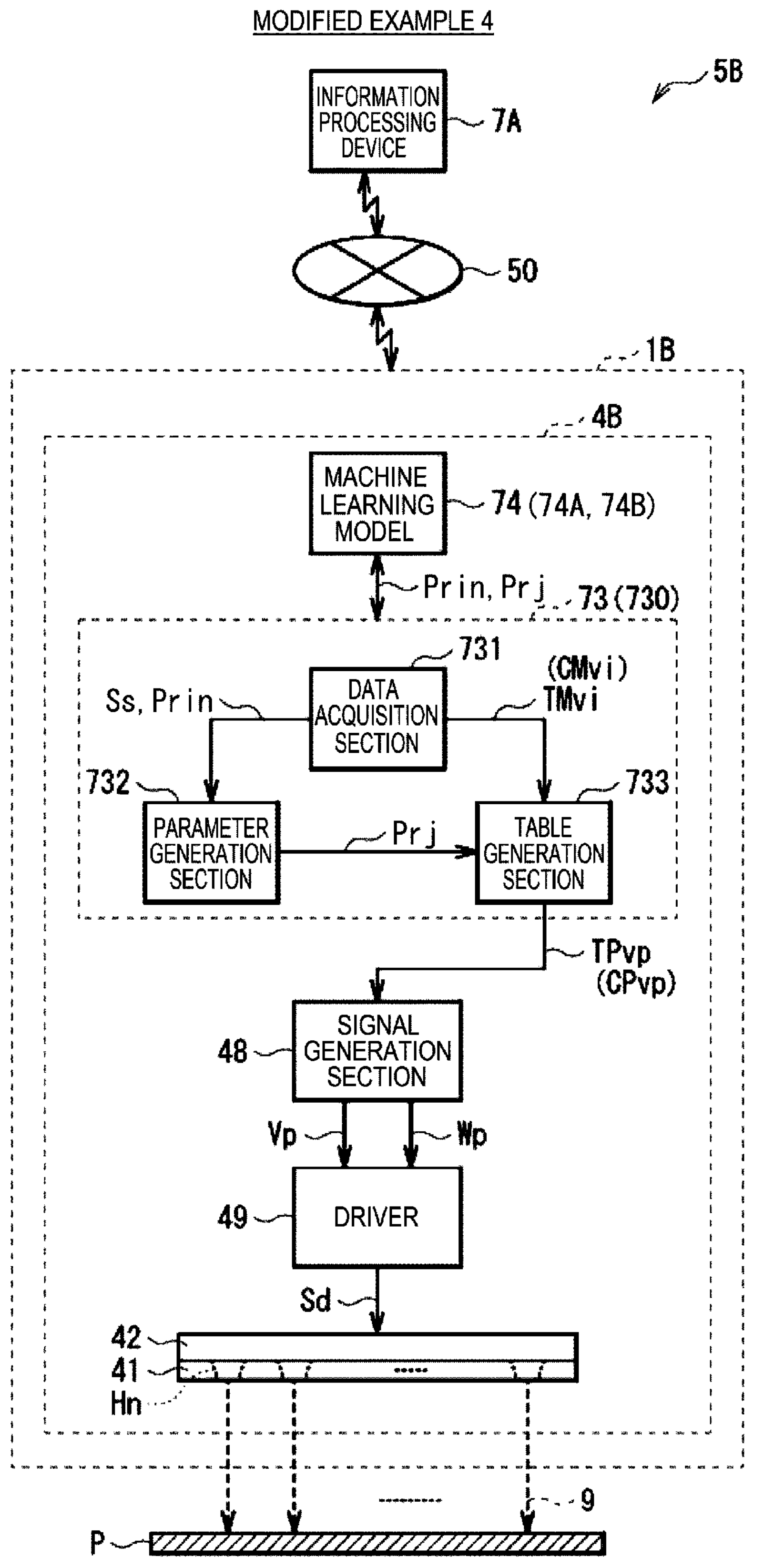
FIG. 33 is a block diagram showing a configuration example of a jet parameter generation system according to Modified Example 4.

FIG. 33 is a block diagram showing a configuration example of a jet parameter generation system 5B according to Modified Example 4. The jet parameter generation system 5B according to Modified Example 4 is provided with a printer 1B having inkjet heads 4B, and the information processing device 7A described above. Further, the printer 1B and the information processing device 7A are connected to each other via the network 50. In other words, the jet parameter generation system 5B corresponds to a system obtained by disposing the information processing device 7A described above instead of the information processing device 7, and at the same time, disposing the printer 1B and the inkjet heads 4B instead of the printer 1 and the inkjet heads 4, respectively, in the jet parameter generation system 5 according to the embodiment.

It should be noted that the printer 1B described above corresponds to a specific example of the "liquid jet recording device" in the present disclosure. Further, the inkjet head 4B described above corresponds to a specific example of the "liquid jet head" in the present disclosure.

In Modified Example 4, as shown in FIG. 33, the information processor 73 (the data acquisition section 731, the parameter generation section 732, and the table generation section 733) described above, in other words, the program 730 described above, is disposed in the inkjet head 4B. Further, the machine learning model 74 described above is also disposed in the inkjet head 4B. In other words, in Modified Example 4, unlike the embodiment and Modified Example 3, the information processor 73 (the program 730) and the machine learning model 74 are disposed in the inkjet head 4B incorporated in the printer 1B.

(Functions/Advantages)

Also in Modified Example 4 having such a configuration, it is possible to obtain substantially the same advantages due to substantially the same function as that of the jet parameter generation system 5 according to the embodiment in the elementary sense as a whole of the jet parameter generation system 5B.

Further, in particular in Modified Example 4, since it is configured that the data acquisition section 731, the parameter generation section 732, and the table generation section 733 are each disposed in the printer 1B, the following results. That is, unlike the embodiment and Modified Example 3, it becomes unnecessary to prepare each of the data acquisition section 731, the parameter generation section 732, and the table generation section 733 in the external device (the information processing device 7 or the server 8). Thus, it is possible to perform the automatic generation of the jet parameters Prj and the predictive voltage characteristic table TPvp by the printer 1B itself, and as a result, it becomes possible to further enhance the convenience of the user.

Further, in Modified Example 4, since it is configured that the data acquisition section 731, the parameter generation section 732, and the table generation section 733 described above are each disposed in the inkjet head 4B incorporated in the printer 1B, the following results. That is, it is possible to perform the automatic generation of the jet parameters Prj and the predictive voltage characteristic table TPvp by the inkjet head 4B itself while keeping the existing configuration with respect to the inkjet heads 4B and the printer 1B themselves. As a result, it becomes possible to further enhance the convenience of the user.

Modified Example 5

(Configuration)

Figure 34:
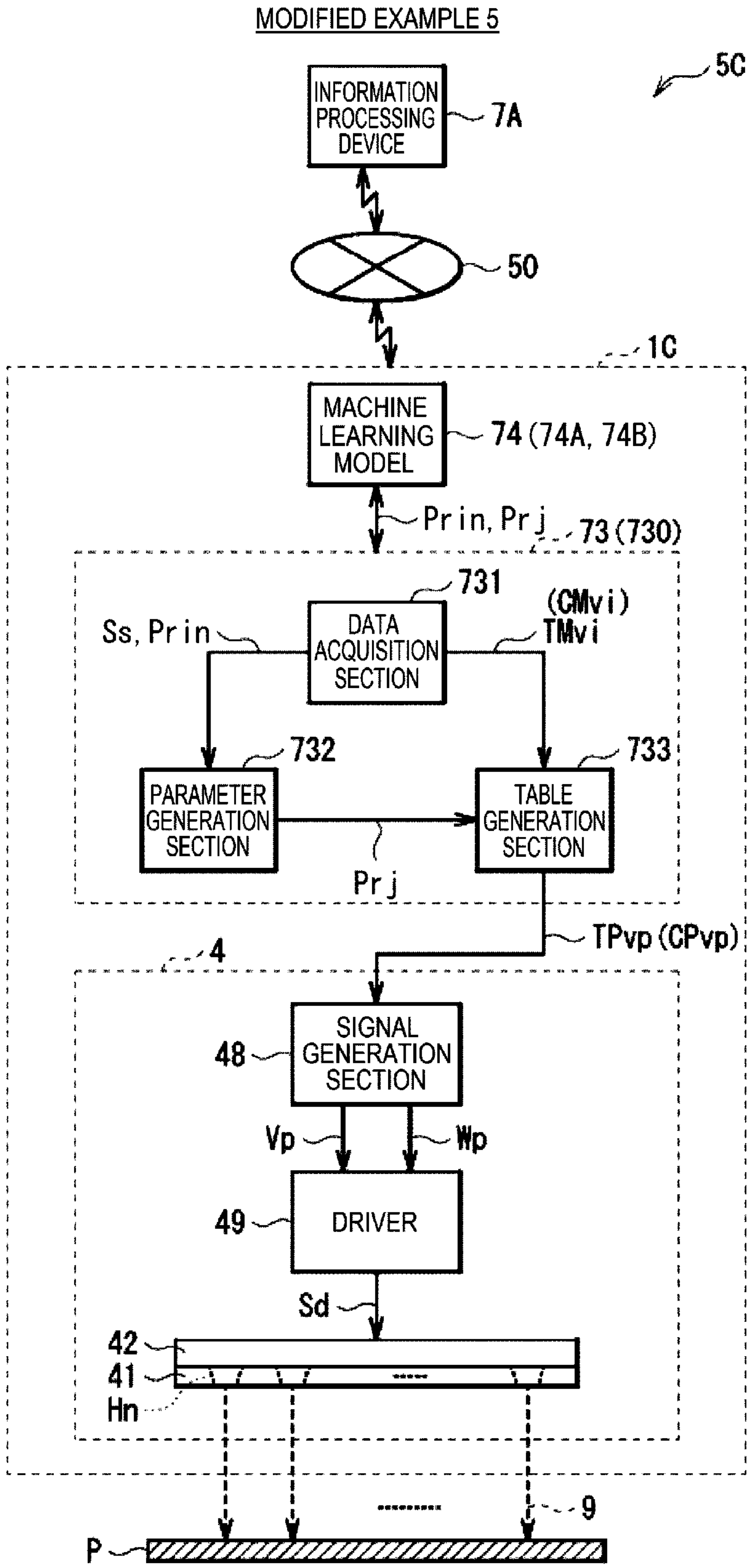
FIG. 34 is a block diagram showing a configuration example of a jet parameter generation system according to Modified Example 5.

FIG. 34 is a block diagram showing a configuration example of a jet parameter generation system 5C according to Modified Example 5. The jet parameter generation system 5C according to Modified Example 5 is provided with a printer 1C having the inkjet heads 4 described above, and the information processing device 7A described above. Further, the printer 1C and the information processing device 7A are connected to each other via the network 50. In other words, the jet parameter generation system 5C corresponds to a system obtained by disposing the information processing device 7A described above instead of the information processing device 7, and at the same time, providing the printer 1C instead of the printer 1 in the jet parameter generation system 5 according to the embodiment.

It should be noted that the printer 1C described above corresponds to a specific example of the "liquid jet recording device" in the present disclosure.

In Modified Example 5, as shown in FIG. 34, the information processor 73 (the data acquisition section 731, the parameter generation section 732, and the table generation section 733) described above, in other words, the program 730 described above, is disposed in the printer 1C similarly to Modified Example 4 (FIG. 33). Further, the machine learning model 74 described above is also disposed in the printer 1C similarly to Modified Example 4. It should be noted that as shown in FIG. 34, in Modified Example 5, unlike Modified Example 4, the information processor 73 (the program 730) and the machine learning model 74 are all disposed outside the inkjet head 4 in the printer 1C.

(Functions/Advantages)

Also in Modified Example 5 having such a configuration, it is possible to obtain substantially the same advantages due to substantially the same function as that of the jet parameter generation system 5 according to the embodiment in the elementary sense as a whole of the jet parameter generation system 5C.

Further, in particular in Modified Example 5, similarly to Modified Example 4 described above, since it is configured that the data acquisition section 731, the parameter generation section 732, and the table generation section 733 are each disposed in the printer 1C, the following results. That is, similarly to the case of Modified Example 4, it is possible to perform the automatic generation of the jet parameters Prj and the predictive voltage characteristic table TPvp by the printer 1C itself, and as a result, it becomes possible to further enhance the convenience of the user.

Modified Example 6

(Configuration)

Figure 35:
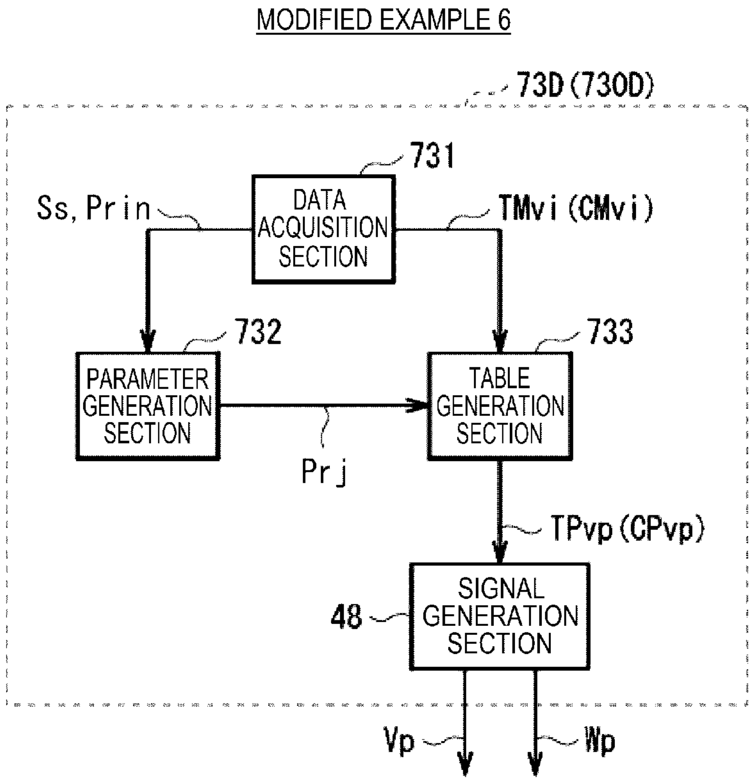
FIG. 35 is a block diagram showing a configuration example of an information processor related to Modified Example 6.

FIG. 35 is a block diagram showing a configuration example of an information processor 73D (a program 730D) related to Modified Example 6. The information processor 73D in Modified Example 6 corresponds to a section obtained by further providing the signal generation section 48 described above to the information processor 73 (having the data acquisition section 731, the parameter generation section 732, and the table generation section 733) described in the embodiment and so on. In other words, the program 730D in Modified Example 6 corresponds to what is obtained by making the program 730 described in the embodiment and so on further include a function of the processing executed by the signal generation section 48 described above.

The configuration of such an information processor 73D (the program 730D) corresponds to a section obtained by further disposing the configuration and the function of the signal generation section 48 in addition to the information processor 73 (the program 730) in the external device (the information processing device 7 or the server 8) of the printer 1 as in, for example, the embodiment or Modified Example 3. In other words, the configuration of the information processor 73D corresponds to an example in which the configuration and the function of the signal generation section 48 are disposed not in the printer 1 but in the external device (the information processing device 7 or the server 8) of the printer 1 unlike the embodiment and Modified Example 3.

(Functions/Advantages)

In Modified Example 6 having such a configuration, it is also possible to obtain basically the same advantages due to substantially the same function as that of the embodiment.

Further, in particular in Modified Example 6, since it is configured that the configuration and the function of the signal generation section 48 are further disposed in the information processor 73D (the program 730D), it is possible to execute the operation (the operation of generating the drive signal Sd) of the signal generation section 48 in a lump in the information processor 73D (the program 730D). As a result, it becomes possible to further enhance the convenience of the user.

3. Other Modified Examples

The present disclosure is described hereinabove citing the embodiment and the modified examples, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer and the inkjet head, but those described in the above embodiment and so on are not limitations, and it is possible to adopt other shapes, arrangements, numbers and so on. Specifically, for example, in the embodiment described above, the description is presented citing the shuttle type printer in which the inkjet heads are translated as an example, but this example is not a limitation, and it is possible to adopt, for example, a single-pass type printer in which the inkjet heads are fixed. Further, in the embodiment and so on described above, the description is presented citing the case in which the ink tanks are housed in a predetermined chassis as an example, but this example is not a limitation, and it is possible to arrange that the ink tanks are disposed outside the chassis. Further, in the embodiment and so on described above, the description is presented mainly citing the case in which the signal generation section is disposed in the inkjet head as an example, but this example is not a limitation, and it is possible to arrange that the signal generation section is disposed outside the inkjet head in the printer.

Further, a variety of types of structures can be adopted as the structure of the inkjet head. Specifically, for example, it is possible to adopt a so-called side-shoot type inkjet head which emits the ink 9 from a central portion in the extending direction of each of the ejection channels in the actuator plate. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as a thermal type (a thermal on-demand type), and an MEMS (Micro Electro-Mechanical Systems) type.

Further, in the embodiment and so on described above, the description is presented citing the non-circulation type inkjet head for using the ink 9 without circulating the ink 9 between the ink tank and the inkjet head as an example, but this example is not a limitation. Specifically, for example, it is also possible to apply the present disclosure to a circulation type inkjet head which uses the ink 9 while circulating the ink 9 between the ink tank and the inkjet head.

In addition, in the embodiment and so on described above, there is presented the description specifically citing the examples of the processing of generating the jet parameters Prj, the characteristic table (the predictive voltage characteristic table TPvp), and the drive signal Sd, but the examples cited in the embodiment and so on are not limitations. Specifically, for example, it is possible to arrange that the processing of generating the jet parameters Prj, the characteristic table, the drive signal Sd, and so on is performed using other methods. Specifically, in the embodiment and so on described above, the description is presented citing the method using the machine learning model as an example of the predetermined analytical methods described above, but this method is not a limitation, and it is possible to arrange to use other analytical methods. Further, the input parameters Prin described above are not limited to the variety of parameters cited in the embodiment and so on described above, and it is possible to arrange to add other parameters to (or substitute other parameters for) the parameters cited in the embodiment and so on described above to be used in the analytical methods.

Further, in the embodiment and so on described above, the description is presented citing an example of the case in which both of the pulse width Wp and the voltage value (the crest value) Vp in the pulse are set (automatically adjusted), and then the drive signal Sd is generated, but this example is not a limitation. Specifically, for example, it is possible to arrange to set only the pulse width Wp out of the pulse width Wp and the voltage value Vp in the pulse, and then generate the drive signal Sd. Further, in the embodiment and so on described above, the description is presented citing the example of the case in which the voltage values Vp in the plurality of pulses are all set to the same value, but it is possible to arrange that, for example, the voltage values Vp in the plurality of pulses are not the same value (at least some of the voltage values Vp are set to a different value). Even in such a case, it is possible to arrange to use the plurality of types of voltage values Vp respectively as the explanatory variables to execute the processing of generating the predictive voltage characteristic table TPvp and so on explained in the embodiment and so on described above.

Further, in the embodiment and so on described above, there is presented the description citing each of the voltage sensitivity Vr, the conversion coefficient Kc, and the voltage shift amount $\Delta$Vp as an example of the jet parameters Prj, but the examples of these cases are not limitations. Specifically, for example, it is possible to arrange that two or more species of these variety of parameters (the voltage sensitivity Vr, the conversion coefficient Kc, the voltage shift amount $\Delta$Vp, and so on) are used in arbitrary combination as the jet parameters Prj. Further, for example, it is possible to arrange to use other parameters than these parameters as the jet parameters Prj.

In addition, in the embodiment and so on described above, there is described the case in which the pulses (the pulses Pa, Pb, and Pc) for expanding the volume of each of the ejection channels are the pulses (positive pulses) for expanding the volume during a period in a High state, but this case is not a limitation. Specifically, besides the case of the pulse for expanding the volume during the period in the High state and contracting the volume during a period in a Low state, it is also possible to adopt pulses (negative pulses) for expanding the volume during the period in the Low state and contracting the volume during the period in the High state by contraries. It should be noted that even in the case of such negative pulses, it is possible for the method of exerting the same function as in the "common drive" described above to apply such "common drive."

Further, for example, it is also possible to arrange that a pulse for helping the ejection of the droplet is additionally applied during the OFF period immediately after the ON period. As the pulse for helping the ejection of the droplet, there can be cited, for example, a pulse for contracting the volume of each of the ejection channels, and a pulse (an auxiliary pulse) for pulling back a part of the droplet having been ejected. Further, the pulse (a main pulse) to be applied immediately before the auxiliary pulse as latter one of the pulses has, for example, a pulse width no larger than the width of the on-pulse peak (AP). It should be noted that even if such a pulse for helping the ejection of the droplet is added, the content of the present disclosure described hereinabove is not affected.

Further, the series of processing described in the embodiment and so on described above can be configured to be performed by hardware (a circuit), or can also be configured to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer. It should be noted that as the recording medium (a non-transitory computer-readable recording medium) on which such programs are recorded, there can be cited a variety of types of media such as a floppy (a registered trademark) disk, a CD (Compact Disk)-ROM, a DVD (Digital Versatile Disc)-ROM, and a hard disk.

Further, in the embodiment and so on described above, the description is presented citing the printer 1 (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A jet parameter generation system configured to generate a predetermined jet parameter to be used when generating a drive signal which is applied to a jet section configured to jet liquid, and which has a single pulse or a plurality of pulses, the system comprising: a data acquisition section configured to obtain a selection instruction signal input from an outside and a predetermined input parameter as input data; and a parameter generation section configured to generate the predetermined jet parameter based on the selection instruction signal and the predetermined input parameter, using a predetermined analytical method taking the predetermined input parameter as an explanatory variable and taking the predetermined jet parameter as an objective variable, wherein the parameter generation section determines which one of a first standard and a second standard is to be selected, based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, selects a first explanatory variable group included in the predetermined input parameter as the explanatory variable when determining that the first standard is to be selected, while selecting a second explanatory variable group included in the predetermine input parameter as the explanatory variable when determining that the second standard is to be selected, and uses the predetermined analytical method using just selected one of the first explanatory variable group and the second explanatory variable group to thereby generate the predetermined jet parameter.

<2> The jet parameter generation system according to <1>, wherein at least a voltage sensitivity of the liquid corresponding to a variation per unit voltage in one of a drop volume of the liquid and an ejection speed of the liquid when the liquid is jetted at a reference temperature is included as the predetermined jet parameter.

<3> The jet parameter generation system according to <2>, wherein as the first explanatory variable group, there is included at least a target value of the drop volume of the liquid, and as the second explanatory variable group, there is included at least one of parameters of a parameter representing presence or absence of a common drive in the drive signal, and a number of drops corresponding to a number of the pulses included in a unit period in the drive signal.

<4> The jet parameter generation system according to <3>, wherein as the first explanatory variable group, there is further included the number of drops, and as the second explanatory variable group, there is further included at least one of parameters of a head rank value which corresponds to the voltage value with which a predetermined ejection speed is achieved when a predetermined test liquid is jetted from the jet section, and which is a value inherent in a liquid jet head having the jet section, a parameter representing a type of the liquid jet head, a specific gravity of the liquid, a surface tension value of the liquid, a viscosity value of the liquid at a reference temperature, and a target value of the ejection speed of the liquid.

<5> The jet parameter generation system according to <3> or <4>, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve, using a conversion coefficient when performing the conversion processing, and an add operation of adding a voltage shift amount to the voltage value in the preliminary characteristic curve to thereby generate the predictive characteristic curve, and as at least one of the first explanatory variable group and the second explanatory variable group, there is further included the voltage shift amount.

<6> The jet parameter generation system according to any one of <1> to <5>, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve using a conversion coefficient when performing the conversion processing, and an add operation of adding a voltage shift amount to the voltage value in the preliminary characteristic curve to thereby generate the predictive characteristic curve, and as the predetermined jet parameter, there is included at least the conversion coefficient.

<7> The jet parameter generation system according to <6>, wherein as the first explanatory variable group, there is included at least one of parameters of a specific gravity of the liquid, a number of drops corresponding to a number of the pulses included in a unit period in the drive signal, a viscosity value of the liquid at a reference temperature, a target value of an ejection speed of the liquid, the voltage shift amount, a voltage sensitivity of the liquid, a parameter representing presence or absence of a common drive in the drive signal, a surface tension value of the liquid, a head rank value which corresponds to the voltage value with which a predetermined ejection speed is achieved when a predetermined test liquid is jetted from the jet section, and which is a value inherent in a liquid jet head having the jet section, a parameter representing a type of the liquid jet head, and a parameter representing a type of the liquid classified according to a chief solvent of the liquid, and as the second explanatory variable group, there is included at least one of parameters of the specific gravity of the liquid, the viscosity value of the liquid at the reference temperature, the number of drops, the voltage shift amount, the voltage sensitivity of the liquid, the parameter representing the type of the liquid, the surface tension value of the liquid, and the head rank value.

<8> The jet parameter generation system according to any one of <1> to <6>, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve using a conversion coefficient when performing the conversion processing, and an add operation of adding a voltage shift amount to the voltage value in the preliminary characteristic curve to thereby generate the predictive characteristic curve, and as the predetermined jet parameter, there is included at least the voltage shift amount.

<9> The jet parameter generation system according to <8>, wherein as the first explanatory variable group, there is included at least one of parameters of a parameter representing presence or absence of a common drive in the drive signal, a viscosity value of the liquid at the reference temperature, a head rank value which corresponds to the voltage value with which a predetermined ejection speed is achieved when a predetermined test liquid is jetted from the jet section, and which is a value inherent in a liquid jet head having the jet section, a parameter representing a type of the liquid jet head, a specific gravity of the liquid, a surface tension value of the liquid, a voltage sensitivity of the liquid, a target value of an ejection speed of the liquid, a parameter representing a type of the liquid classified according to a chief solvent of the liquid, and a number of drops corresponding to a number of the pulses included in a unit period in the drive signal, and as the second explanatory variable group, there is included at least one of parameters of the voltage sensitivity of the liquid, the viscosity value of the liquid at the reference temperature, the head rank value, the parameter representing the type of the liquid jet head, the surface tension value of the liquid, the specific gravity of the liquid, the parameter representing presence or absence of the common drive in the drive signal, the target value of the ejection speed of the liquid, the number of drops, and the parameter representing the type of the liquid.

<10> The jet parameter generation system according to any one of <1> to <9>, wherein the predetermined analytical method is a method using a machine learning model to which the predetermined input parameter is input, and from which the predetermined jet parameter is output.

<11> The jet parameter generation system according to any one of <1> to <10>, further comprising: a table generation section configured to perform conversion processing from a measured characteristic curve between viscosity and temperature of the liquid to a predictive characteristic curve between the voltage value and temperature using at least one of the predetermined jet parameter to thereby generate a predictive voltage characteristic table defining the predictive characteristic curve based on a measured viscosity characteristic table defining the measured characteristic curve; and a signal generation section which is configured to obtain a crest value of the pulse using the predictive voltage characteristic table generated by the table generation section, and which is configured to generate the drive signal using the pulse having the crest value obtained.

<12> The jet parameter generation system according to any one of <1> to <11>, wherein the data acquisition section and the parameter generation section are disposed in an external device located outside a liquid jet recording device incorporating a liquid jet head having the jet section.

<13> The jet parameter generation system according to any one of <1> to <11>, wherein the data acquisition section and the parameter generation section are disposed in a liquid jet recording device incorporating a liquid jet head having the jet section.

<14> The jet parameter generation system according to <13>, wherein the data acquisition section and the parameter generation section are disposed in the liquid jet head.

<15> A method of generating a predetermined jet parameter to be used when generating a drive signal which is applied to a jet section configured to jet liquid, and which has a single pulse or a plurality of pulses, the method comprising: obtaining a selection instruction signal input from an outside and a predetermined input parameter as input data; and generating the predetermined jet parameter based on the selection instruction signal and the predetermined input parameter, using a predetermined analytical method taking the predetermined input parameter as an explanatory variable and taking the predetermined jet parameter as an objective variable, wherein when generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

<16> A program of generating a predetermined jet parameter to be used when generating a drive signal which is applied to a jet section configured to jet liquid, and which has a single pulse or a plurality of pulses, the program making a computer execute processing comprising: obtaining a selection instruction signal input from an outside and a predetermined input parameter as input data; and generating the predetermined jet parameter based on the selection instruction signal and the predetermined input parameter, using a predetermined analytical method taking the predetermined input parameter as an explanatory variable and taking the predetermined jet parameter as an objective variable, wherein when generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

<17> A non-transitory computer-readable storage medium storing a program of generating a predetermined jet parameter to be used when generating a drive signal which is applied to a jet section configured to jet liquid, and which has a single pulse or a plurality of pulses, the program making a computer execute processing comprising: obtaining a selection instruction signal input from an outside and a predetermined input parameter as input data; and generating the predetermined jet parameter based on the selection instruction signal and the predetermined input parameter, using a predetermined analytical method taking the predetermined input parameter as an explanatory variable and taking the predetermined jet parameter as an objective variable, wherein when generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

What is claimed is:

1. A jet parameter generation system configured to generate a predetermined jet parameter to be used when generating a drive signal which is applied to a jet section configured to jet liquid, and which has a single pulse or a plurality of pulses, the system comprising:

a data acquisition section configured to obtain a selection instruction signal input from an outside and a predetermined input parameter as input data; and a parameter generation section configured to generate the predetermined jet parameter based on the selection instruction signal and the predetermined input parameter, using a predetermined analytical method taking the predetermined input parameter as an explanatory variable and taking the predetermined jet parameter as an objective variable, wherein the parameter generation section determines which one of a first standard and a second standard is to be selected, based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, selects a first explanatory variable group included in the predetermined input parameter as the explanatory variable when determining that the first standard is to be selected, while selecting a second explanatory variable group included in the predetermine input parameter as the explanatory variable when determining that the second standard is to be selected, and uses the predetermined analytical method using just selected one of the first explanatory variable group and the second explanatory variable group to thereby generate the predetermined jet parameter.

2. The jet parameter generation system according to claim 1, wherein at least a voltage sensitivity of the liquid corresponding to a variation per unit voltage in one of a drop volume of the liquid and an ejection speed of the liquid when the liquid is jetted at a reference temperature is included as the predetermined jet parameter.

3. The jet parameter generation system according to claim 2, wherein as the first explanatory variable group, there is included at least a target value of the drop volume of the liquid, and as the second explanatory variable group, there is included at least one of parameters of a parameter representing presence or absence of a common drive in the drive signal, and a number of drops corresponding to a number of the pulses included in a unit period in the drive signal.

4. The jet parameter generation system according to claim 3, wherein as the first explanatory variable group, there is further included the number of drops, and as the second explanatory variable group, there is further included at least one of parameters of a head rank value which corresponds to the voltage value with which a predetermined ejection speed is achieved when a predetermined test liquid is jetted from the jet section, and which is a value inherent in a liquid jet head having the jet section, a parameter representing a type of the liquid jet head, a specific gravity of the liquid, a surface tension value of the liquid, a viscosity value of the liquid at a reference temperature, and a target value of the ejection speed of the liquid.

5. The jet parameter generation system according to claim 3, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve, using a conversion coefficient when performing the conversion processing, and an add operation of adding a voltage shift amount to the voltage value in the preliminary characteristic curve to thereby generate the predictive characteristic curve, and as at least one of the first explanatory variable group and the second explanatory variable group, there is further included the voltage shift amount.

6. The jet parameter generation system according to claim 1, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve using a conversion coefficient when performing the conversion processing, and an add operation of adding a voltage shift amount to the voltage value in the preliminary characteristic curve to thereby generate the predictive characteristic curve, and as the predetermined jet parameter, there is included at least the conversion coefficient.

7. The jet parameter generation system according to claim 1, wherein as conversion processing from a measured characteristic curve between viscosity and temperature of the liquid to a predictive characteristic curve between the voltage value and temperature to be used when generating the drive signal, there are included preliminary processing of generating a preliminary characteristic curve representing a relationship between the voltage value and temperature from the measured characteristic curve using a conversion coefficient when performing the conversion processing, and an add operation of adding a voltage shift amount to the voltage value in the preliminary characteristic curve to thereby generate the predictive characteristic curve, and as the predetermined jet parameter, there is included at least the voltage shift amount.

8. The jet parameter generation system according to claim 1, wherein the predetermined analytical method is a method using a machine learning model to which the predetermined input parameter is input, and from which the predetermined jet parameter is output.

9. The jet parameter generation system according to claim 1, further comprising:

a table generation section configured to perform conversion processing from a measured characteristic curve between viscosity and temperature of the liquid to a predictive characteristic curve between the voltage value and temperature using at least one of the predetermined jet parameter to thereby generate a predictive voltage characteristic table defining the predictive characteristic curve based on a measured viscosity characteristic table defining the measured characteristic curve; and a signal generation section which is configured to obtain a crest value of the pulse using the predictive voltage characteristic table generated by the table generation section, and which is configured to generate the drive signal using the pulse having the crest value obtained.

10. The jet parameter generation system according to claim 1, wherein the data acquisition section and the parameter generation section are disposed in an external device located outside a liquid jet recording device incorporating a liquid jet head having the jet section.

11. The jet parameter generation system according to claim 1, wherein the data acquisition section and the parameter generation section are disposed in a liquid jet recording device incorporating a liquid jet head having the jet section.

12. The jet parameter generation system according to claim 11, wherein the data acquisition section and the parameter generation section are disposed in the liquid jet head.

13. A method of generating a predetermined jet parameter to be used when generating a drive signal which is applied to a jet section configured to jet liquid, and which has a single pulse or a plurality of pulses, the method comprising:

obtaining a selection instruction signal input from an outside and a predetermined input parameter as input data; and generating the predetermined jet parameter based on the selection instruction signal and the predetermined input parameter, using a predetermined analytical method taking the predetermined input parameter as an explanatory variable and taking the predetermined jet parameter as an objective variable, wherein when generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

14. A non-transitory computer-readable storage medium storing a program of generating a predetermined jet parameter to be used when generating a drive signal which is applied to a jet section configured to jet liquid, and which has a single pulse or a plurality of pulses, the program making a computer execute processing comprising:

obtaining a selection instruction signal input from an outside and a predetermined input parameter as input data; and generating the predetermined jet parameter based on the selection instruction signal and the predetermined input parameter, using a predetermined analytical method taking the predetermined input parameter as an explanatory variable and taking the predetermined jet parameter as an objective variable, wherein when generating the predetermined jet parameter, which one of a first standard and a second standard is to be selected is determined based on the selection instruction signal representing which one of the first standard and the second standard is to be selected, a voltage value representing a crest value of the pulse in the drive signal being set to a voltage value with which a drop volume of the liquid to be a reference is obtained based on the first standard, and being set to a voltage value with which an ejection speed of the liquid to be a reference is obtained based on the second standard, a first explanatory variable group included in the predetermined input parameter is selected as the explanatory variable when determining that the first standard is to be selected, while a second explanatory variable group included in the predetermine input parameter is selected as the explanatory variable when determining that the second standard is to be selected, and the predetermined analytical method using just selected one of the first explanatory variable group and the second explanatory variable group is used to thereby generate the predetermined jet parameter.

* * * * *